US006900617B2

(12) United States Patent
Duff, Jr.

(10) Patent No.: US 6,900,617 B2
(45) Date of Patent: *May 31, 2005

(54) METHOD AND CIRCUIT FOR USING POLARIZED DEVICE IN AC APPLICATIONS

(76) Inventor: William B. Duff, Jr., 22 Shiloh Rd., Odessa, TX (US) 79762-8400

( * ) Notice: Subject to any disclaimer, the term of this patent is extended or adjusted under 35 U.S.C. 154(b) by 0 days.

This patent is subject to a terminal disclaimer.

(21) Appl. No.: 10/679,706

(22) Filed: Oct. 3, 2003

(65) Prior Publication Data

US 2004/0183503 A1 Sep. 23, 2004

Related U.S. Application Data

(63) Continuation of application No. 09/710,998, filed on Nov. 9, 2000, now Pat. No. 6,633,154.
(60) Provisional application No. 60/174,433, filed on Jan. 4, 2000.

(51) Int. Cl.$^7$ .............................................. H01M 10/46
(52) U.S. Cl. ...................................................... 320/166
(58) Field of Search .......................... 363/98, 126, 131, 363/20, 17, 37; 320/166, 167; 315/205, 219, 247; 361/111, 502, 522

(56) References Cited

U.S. PATENT DOCUMENTS

| | | |
|---|---|---|
| 3,392,808 A | 7/1968 | Frank |
| 3,931,565 A | 1/1976 | Hase |
| 4,227,139 A | 10/1980 | Rosink et al. |
| 4,408,269 A | 10/1983 | Nowaczyk |
| 4,412,278 A | 10/1983 | Cambier et al. |
| 4,445,379 A | 5/1984 | Yamaguchi et al. |
| 4,456,880 A | 6/1984 | Warner |
| 4,463,414 A | 7/1984 | Landis |
| 4,523,269 A | 6/1985 | Baker et al. |
| 4,581,681 A | 4/1986 | Feilhauer |
| 4,648,700 A | 3/1987 | Nagaoka |
| 4,672,289 A | 6/1987 | Ghosh et al. |
| 4,672,290 A | 6/1987 | Ghosh et al. |
| 4,716,515 A | 12/1987 | Alexander |
| 4,794,288 A | 12/1988 | Lewus |
| 4,795,951 A | 1/1989 | Gaebel et al. |
| 4,804,985 A | 2/1989 | Reilich |
| 4,853,607 A | 8/1989 | Walter et al. |
| 4,975,796 A | 12/1990 | MacDougall |
| 5,008,795 A | 4/1991 | Parsley et al. |
| 5,045,774 A | 9/1991 | Bromberg |
| 5,063,340 A | 11/1991 | Kalenowsky |
| 5,063,490 A | 11/1991 | Maehara et al. |
| 5,077,520 A | 12/1991 | Schweitzer, Jr. |
| 5,089,949 A | 2/1992 | Gentile |
| 5,412,557 A | 5/1995 | Lauw |
| 5,450,014 A | 9/1995 | Lee |
| 5,502,375 A | 3/1996 | Marek |
| 5,545,933 A | 8/1996 | Okamura et al. |
| 5,598,080 A | 1/1997 | Jensen et al. |
| 5,705,974 A | 1/1998 | Patel et al. |
| 5,714,864 A | 2/1998 | Rose et al. |
| 5,731,948 A | 3/1998 | Yializis et al. |
| 5,777,840 A | 7/1998 | Oney |

FOREIGN PATENT DOCUMENTS

| | | |
|---|---|---|
| DE | 1588519 | 12/1970 |
| DE | 4401955 | 7/1995 |

OTHER PUBLICATIONS

Siemens Matsushita Components GmbH & Co. KG, Ordering No. B426–P2612–X–X–7600 (Data Book), p. 9, (1999) (printed in Germany DB 11987.5).
The Art Of Electronics, Second Edition, eds. Horowitz and Hill, Cambridge University Press, pp. 22, 69–72, 77–79, 84–87, 1989.
The Electronics Problem Solver (Revised), Research and Education Association, pp. 118–120, 423–427, 436–439, 1988.
Dorf, Introduction to Electric Circuits, John Wiley and Sons, 1989.
IEEE Recommended Practices and Requirements for Harmonic Control in Electrical Systems, Institute of Electrical and Electronics Engineers, pp. 7–11, 35–39, 1993.
Whitaker. AC Power Systems, CRC Press, pp. 121–125, 1991.
Elgerd, Electric Energy Systems Theory, McGraw–Hill, pp. 469–470, 1982.
Standard Handbook for Electrical Engineers Twelfth Edition, eds. Fink and Beaty, McGraw–Hill, pp. 18.51–18.52, 1987.
Nilsson, Electric Circuits, Third Edition, Addison–Wesley Publishing, pp. 756–759, 763, 1990.
Stevenson, Jr., Elements of Power System Analysis, Fourth Edition, pp. 248–267, 1982.
Product catalog, "Capacitors," Cornell–Dubilier, pp. 2.161–2.180, Feb. 2000.

Primary Examiner—Edward H. Tso
(74) Attorney, Agent, or Firm—Fulbright & Jaworski LLP

(57) ABSTRACT

Polarized electric charge storage devices economically provide high available capacitance. The present invention directly employs polarized electrical charge storage (PECS) devices such as polarized capacitors or electrochemical batteries in general AC applications with a novel circuit topology. In one embodiment, an anti-series configuration of first and second PECS devices are used within an AC network for enhancing operation of the AC network. At least one DC source is provided for maintaining the PECS devices forwardly biased while they are subjected to an AC signal. The AC signal, which drives an AC load, is applied to the anti-series devices. The devices are sufficiently biased by the at least one DC voltage source so that they remain forwardly biased while coupling the AC signal.

20 Claims, 21 Drawing Sheets

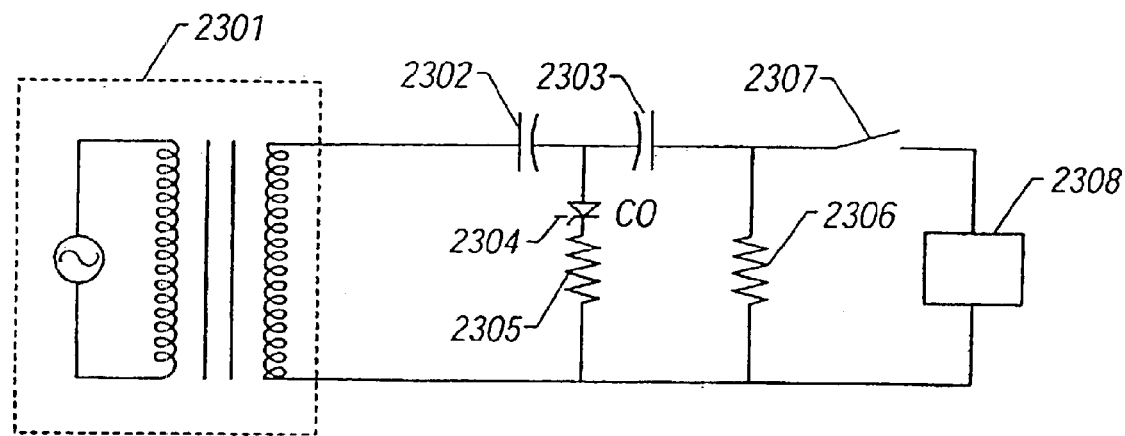
FIG. 23
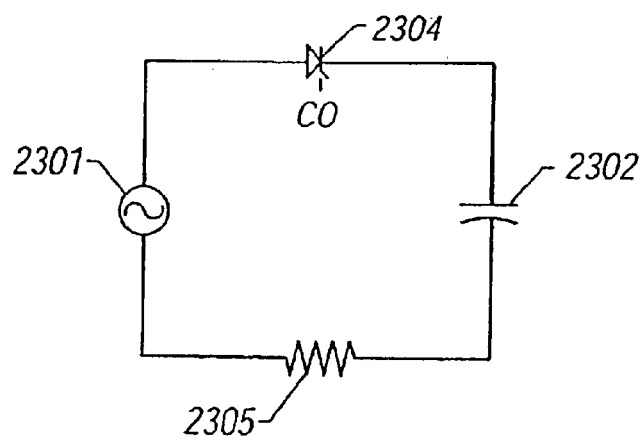
FIG. 23-A

METHOD AND CIRCUIT FOR USING POLARIZED DEVICE IN AC APPLICATIONS

This application is a continuation of non-provisional U.S. application Ser. No. 09/710,998, now U.S. Pat. No. 6,633,154, entitled "Method and Circuit for Using Polarized Device in AC Applications," filed Nov. 9, 2000, which claims benefit of provisional Application Ser. No. 60/174,433, entitled "Method and Circuit for Using Polarized Device in AC Applications," filed: Jan. 4, 2000. Each of these applications are hereby incorporated by reference into this application.

TECHNICAL FIELD OF THE INVENTION

The present invention generally relates to the use of polarized electrical charge storage devices in AC applications. In particular, the present invention relates to biasing polarized devices, such as polarized capacitors with a DC potential for uses in general AC applications.

BACKGROUND

Capacitors are used for a variety of purposes including energy storage, signal coupling, motor starting, power factor correction, voltage regulation, tuning, resonance and filtration. In series and shunt implementations, there are many operational advantages, both transient and steady state, for implementing capacitors in general AC networks.

Network efficiency is increased with power factor improvement, during transient conditions. Transient applications of series capacitors include voltage surge protection, motor starting, current limiting, switching operations and the like. Series capacitors can moderate the effects of AC network faults and other transient conditions. For example, low power factor transient currents are associated with magnetic inrush currents due to motor starting, transformer inrush and fault currents. Series capacitance improves the overall power factor and network voltage regulation during these transient conditions. Series capacitor banks also demonstrate a degree of current limiting due to the series impedance of the capacitor. This reduces fault currents and thus reduces generator, transformer, switchgear, bus and transmission line size requirements. The capacitor in series with the fault acts as a current limiting device. Tuned circuits composed of inductors and capacitors (LC circuits) are used for filtration. A high induction series version can dramatically increase network fault impedance by deliberately shorting out the capacitor bank. A series capacitor bank is typically coupled to a transformer. Transformer opposition to instantaneous current change combines with capacitor opposition to instantaneous voltage change. These characteristics lead to greater instantaneous network voltage stability as a result of increased use of series capacitor banks. Secondary effects include voltage surge protection, demand factor improvement and voltage regulation. Instantaneous power transfer efficiency can be improved with proper capacitor use. While these many series capacitor advantages are well known, and proven in the lab, unit cost and size requirements have prevented their general implementation.

AC network steady state characteristics are also improved through the incorporation of capacitors. High capacitance, series applications impress a low steady state AC voltage on the capacitor. This is helpful when electrical transfer devices are used in conjunction with series capacitor banks. Electrical wave distortion is similarly reduced with increasing capacitance. Steady state series capacitor applications include motor running, filtration, power factor correction, efficient power transfer, voltage boosting and the like. Series capacitor banks allow induction generators to power induction motors, by providing the required magnetizing [VARs] for both devices. This can also improve the power quality, while reducing the cost of electric grid alternative sources, emergency power supplies, mobile equipment and portable generators. Mechanical stress associated with bringing additional generation capacity, on line, to synchronous operation, can be moderated by the presence, of series capacitive coupling.

The two major capacitor categories are polar and non-polar. There are many realizations of each category. Due to their unidirectional, forward biasing requirements, polarized capacitors are mostly used in DC and small AC signal applications. Polarized capacitors are widely used in DC filtering applications, such as output stages of DC power supplies. Audible frequency (music) amplifiers use a DC biased polarized capacitor to couple signals. Conversely, non-polarized capacitors are generally useful in both DC and general AC applications. Unfortunately, non-polarized capacitors—especially in series applications—are not well suited for many AC and DC uses due to their limitations in size, capacitance, weight, efficiency, energy density and cost. The use of undersized non-polar capacitor banks causes significant current waveform distortion and a large voltage drop across the capacitor, which results in energy losses and poor AC voltage regulation at the AC load.

Conversely, polarized capacitors, as well as other polarized electric charge storage (PECS) devices, have a low cost per unit of capacitance, as well as smaller mass and dimensions, as compared with nonpolar capacitors. These characteristics favor their use over non-polarized capacitors. They also exhibit a relatively low series AC resistance at power frequencies. However, they may only be effectively operated with positive "forward" voltages relative to their positive and negative poles. A reversed voltage of any significant magnitude causes the capacitor to short, which usually results in an explosion that can be comparable to that of a hand grenade. In fact, with solid tantalum capacitors, this short circuit failure mode includes spontaneous combustion. Thus, polarized capacitors, for the most part, have not been amenable for general AC applications.

FIG. 1 models the normal operation of a polarized aluminum electrolytic capacitor as well as circuit operation in over-voltage and reverse bias voltage mode. The model consists of series inductor 101, series resistor 102, parallel resistor 103, zener diode 104 and polarized capacitor 105. Zener diode 104 models the forward and reverse shorting condition present when the impressed voltage exceeds a reverse bias voltage of 1.5 Volts or a forward bias condition of approximately 50 Volts over the rated working DC voltage (WVDC) of the capacitor. Inductor 101 is suitable for modeling the self-resonant frequency of the capacitor. The series resistor 102 models the (small, mΩ) equivalent series resistance (ESR) measured in capacitor operation. The parallel resistor 103 models the (large, MΩ) equivalent parallel resistance measured in capacitor DC leakage current phenomenon. In low frequency operation, forward biased voltage within the device working voltage conditions will allow signal current flow through the directional capacitor 105. Reverse bias conditions will occasion a short through diode 104.

The capacitor will suitably operate continuously between zero volts and the rated working DC voltage. A reverse bias voltage of up to about 1.5 volts DC to a rated forward bias surge voltage defines the outer limits of appropriate transient use of the capacitor. Capacitor operation outside this wider voltage envelope will cause short circuit conditions. There is typically a third, higher impulse voltage parameter. Excessive forward voltage on the capacitor will cause a reverse current flow through zener diode 104. This electrical behavior is schematically modeled by depicting a zener diode 104 in parallel, but with opposite polarity alignment than the polar capacitor. Shorting through diode 104, in either direction permits excessive current, heat buildup, which eventuates capacitor failure. This is why a single polarized capacitor fails in normal AC operation.

FIG. 2 depicts a simple circuit realization 250 that illustrates a typical prior art use of a DC biased polarized capacitor in a small AC signal coupling application. This circuitry is commonly used as a laboratory exercise for undergraduate analog electronic students and is employed in multi-stage amplifiers. Circuit 250 includes an AC signal source 255 superimposed upon a DC bias voltage source 260, a capability of lab power supplies. The AC signal is coupled to the load 266, while the DC bias voltage is blocked by and positively biases a polarized capacitor 262. The capacitor and DC bias voltage are selected so that the superimposed AC and DC voltages are at all times within the proper voltage window. The AC source output section conducts the entire DC power source output, and vices versa. As the AC signal increases in magnitude relative to the capacitor rated DC working voltage, waveform distortion in the form of clipping occurs. Thus, the lowest waveform distortion occurs for small AC signals. The magnitude of the bias voltage is typically on the order of half the rated capacitor DC working voltage. The fidelity of AC waveform transfer improves as the magnitudes of the AC voltage signal, and the AC current are decreased.

A non-polarized capacitor 264 is shown in parallel with the polarized capacitor 262 for "polishing." Non-polarized polishing capacitors may be used for fine-tuning resonance, adjusting capacitance to current ratio, reducing ESR, adjusting bandwidth, improving waveform transfer, flattening the frequency response and improving other such application specific aspects. The capacitance of the polarized capacitor 262 typically may exceed that of the polishing capacitor 264 by approximately two orders of magnitude. The non-polarized polishing capacitor works to reduce distortion of the signal.

FIG. 3 shows Circuit 300, which includes AC source 305, anti-series polarized capacitors 312, 314, collectively referred to as 310 and AC load 320. The polarity marks, above the caps, show an instantaneous forward bias condition of capacitor 312 and a simultaneous reverse bias condition of capacitor 314, which occurs during a positive phase of AC source 305. (Of course, the polarities would be reversed during the negative phase.)

Anti-series configurations of polarized capacitors will operate transiently, or in current limited applications. Such a conventionally implemented, anti-series configuration exploits the previously described internal zener diode-like behavior. It is typically used in single-phase motor starting applications and is plagued by overheating and short life due to reverse bias shorting. When capacitor 312 is forward biased by the AC source, capacitor 314 is reverse biased and shorts the half wave current to the load 320. On the next half wave, capacitor 314 is forward biased while capacitor 312 is shorted. This conventional anti-series configuration is notable for a DC bias condition, which oscillates on a sub-cycle (half cycle) basis.

With reference to FIG. 4, U.S. Pat. Nos. 4,672,289 and 4,672,290 to Ghosh teach an improved scheme for implementing anti-series, polarized capacitors in AC environments. Circuit 460 is shown in FIG. 4. Circuit 460 includes polarized capacitors 462, 464 and diodes 466, 468 in series with AC source 461 for driving AC load 470. Anti-series symmetrical polarized capacitors 462, 464 are in parallel with oppositely aligned anti-series diodes 466, 468. In operation, a parallel "shunt" diode (466, 468), clamps the maximum instantaneous negative voltage across each capacitor, which protects each polarized capacitor from being excessively reverse biased. The Ghosh circuit provides external discrete diodes to shunt the reverse currents away from each capacitor. The internal zener diode-like behavior is reduced. This reduces the heat build-up in the capacitors and extends their expected life.

Unfortunately, however, this shunting diode solution has certain material drawbacks. Each capacitor polarity is subjected to the full AC voltage, across the assembly, for one half of the AC waveform. Thus for a short circuit, motor starting, transformer inrush or similar condition, the entire AC source tension is impressed across the terminals, of each anti-series capacitor, and diode assembly, with a 50% duty cycle. No volt divider is present. Thus, the realizable AC ripple voltage is limited to available diode voltage ratings, for a given level of AC signal distortion. In addition, each polarized capacitor is subjected to a low voltage, reverse bias condition approximately 50% of the time. The diodes distort the AC network voltage waveform. Moreover, the self-biasing circuitry is not amenable to diode current limitation. These are problems in the steady state condition, due to heat loss, current waveform distortion and diode size requirements. These are even more significant problems for semiconductors in transient, fault, magnetizing inrush, resonance and/or starting applications. The entire circuit current passes through each diode with a 50% duty cycle in both the steady state and the transient case. This results in a significant heat loss through the diodes. Also, the self-bias DC voltage oscillation perturbs the system ground reference and further adds to the heat dissipation. AC signal distortion is present due to clipping as a result of inadequate DC bias voltage relative to the AC signal size. The energy required for capacitor charge reformation per half cycle is a further energy loss. In addition, this prior art solution is not suitable for use with other polarized charge storage devices such as many electrochemical batteries.

Furthermore, the circuit exhibits an absence of economy of scale for increased current requirements. If the capacitor bank amperage rating is doubled, so too must the diodes, heat sinks and the like. This constitutes a major capital expense in high current AC applications. If additional series diodes are required to increase the realizable voltage level, the additional diodes must have the same ampacity as the existing diodes. The forward voltage drop of, each existing diode, is matched, by the forward voltage drop of, each additional unit. Thus, power loss and heat generation increase proportionally. Also, the dead-zone about zero, of each diode, is multiplied, by the number of diodes in series.

This waveform distortion, due to the anti-series diode placement, e.g., in the Ghosh circuit, and the internal zener diode behavior in the conventional anti-series arrangement is thus intractable. In addition, the Ghosh and conventional circuits have an ongoing oscillatory effect on the system DC ground reference. These problems make the conventional and Ghosh devices unsuitable for general AC applications. These two technologies operate outside of the small signal regime wherein AC voltage distortion can be minimized.

With reference to FIG. 5, German Patent No. DE4401955 to Norbert discloses a circuit 500 for using polarized capacitors in transient AC applications. As taught by Norbert, circuit 500 is designed to be primarily a phase shifter for starting single-phase asynchronous motors. The circuit 500 is composed of AC source 501, anti-series pair 502, resistor 503, diode 504, inductive load 505 and switch 506. Diode 504 and resistor 503 are permanently connected to the AC voltage source 501 or alternately to a different negative voltage source. After a latency period with switch 506 open, the diode/resistor combination will gradually forwardly bias the capacitor pair. The Norbert circuit preconditions the capacitor for proper starting of the AC load, and increases the expected life over that of the Ghosh circuit when an adequate latency period is available prior to motor starting.

Norbert allows the use of small diode ampacities relative to Ghosh. Norbert also proposes a high impedance connection to the anti-series capacitor center node, in an economic single can configuration. Only external diode, resistor and AC source connections are required to render the circuit ready for use.

Unfortunately, The Norbert circuit requires substantial time for capacitor biasing. The capacitors are charged to just under the magnitude of the AC voltage (peak to zero). For this reason, the Norbert circuit is incompatible with the use of low working voltage polarized capacitors in high AC system voltage applications. In addition, the circuit is unsuitable for use with other polarized charge carrier devices such as electrochemical batteries. Moreover, the Norbert circuit is unsuitable for continuous use in that the reforming charge tends to deteriorate over time if the single-phase motor or other load remains connected following start. The circuit will then behave identically to the conventional, uncharged anti-series configuration. The Norbert circuit will thus exhibit the disadvantage of clipping the AC waveform signal due to exceeding the small AC signal requirement in the steady state case.

Accordingly, a need remains for an improved method and circuit for using polarized charge storage devices such as polarized capacitors in AC applications including steady-state AC applications.

SUMMARY OF THE INVENTION

Polarized electric charge storage devices economically provide high available capacitance. The present invention directly employs polarized electrical charge storage (PECS) devices such as polarized capacitors or electrochemical batteries in general AC applications with a novel circuit topology. In one embodiment, an anti-series configuration of first and second PECS devices are used within an AC network for enhancing operation of the AC network. At least one DC source is provided for maintaining the PECS devices forwardly biased while they are subjected to an AC signal. The AC signal, which drives an AC load, is applied to the anti-series devices. The devices are sufficiently biased by the at least one DC voltage source so that they remain forwardly biased while coupling the AC signal.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which:

FIG. 23 depicts a simple controlled biasing circuit, in another embodiment of the present invention, suitable for continuous operation.

FIG. 23A is a simplified schematic of the charging mechanism of FIG. 23.

DETAILED DESCRIPTION

Overview

Figure 1:
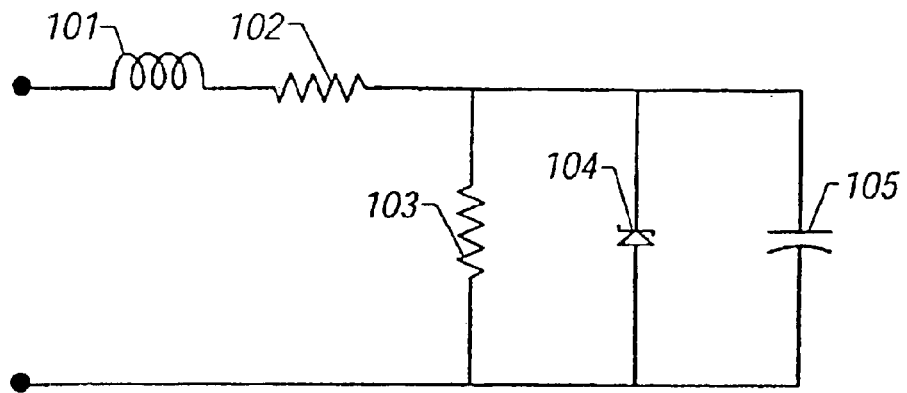
FIG. 1 is a prior art circuit model for electrolytic capacitors.
Figure 2:
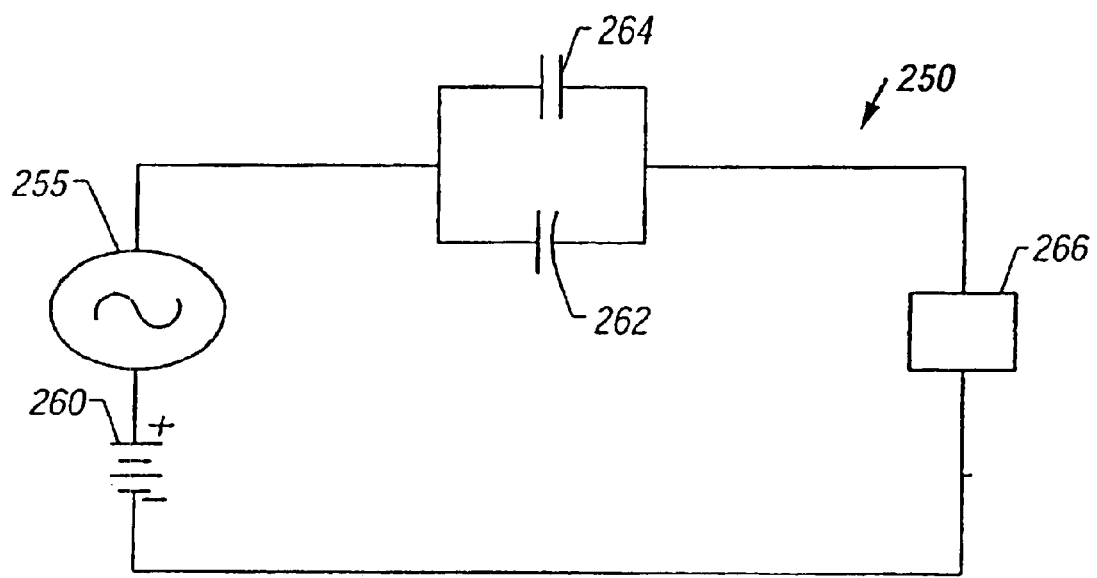
FIG. 2 depicts a prior art circuit employing polarized and unpolarized capacitors in a small AC signal coupling application typically present in analog audio amplifiers.
Figure 3:
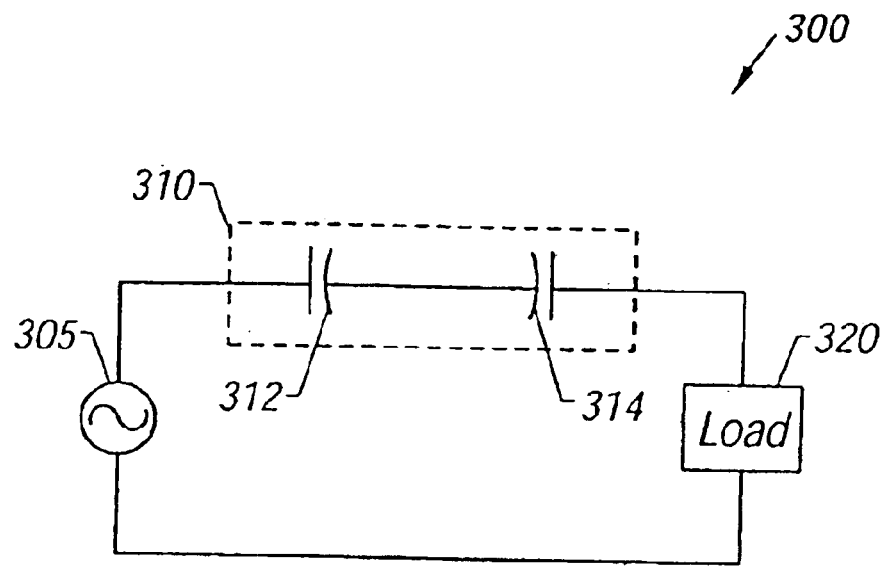
FIG. 3 shows a commercially available conventional antiseries polarized capacitor pair coupling an AC signal to an AC load typically used in motor starting applications.
Figure 4:
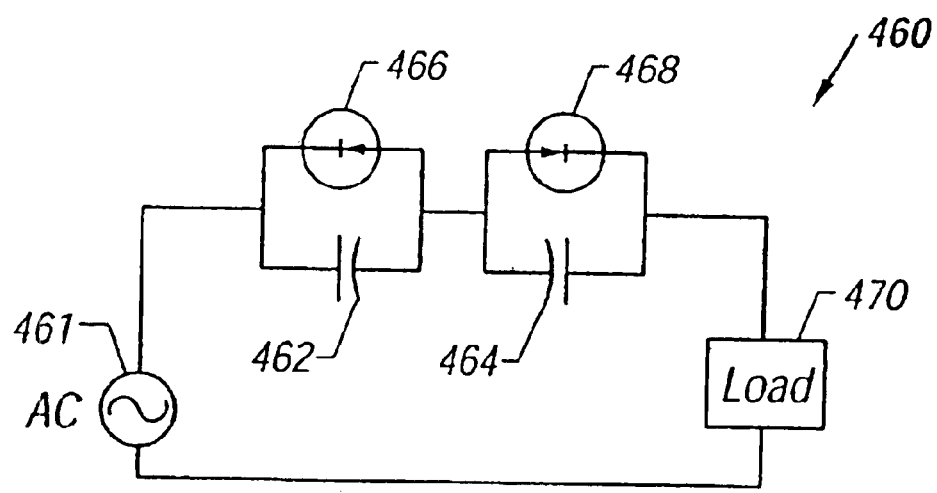
FIG. 4 shows a prior art improvement to the circuit of FIG. 3.
Figure 5:
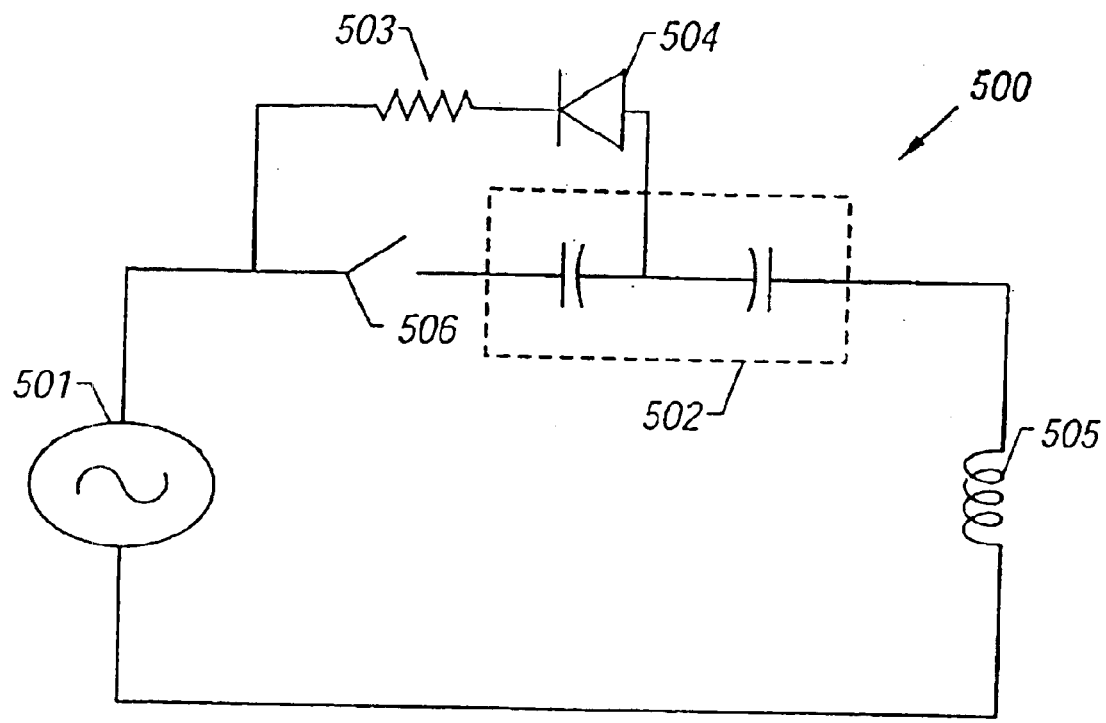
FIG. 5 also depicts a prior art improvement to the circuit of FIG. 3.
Figure 6A:
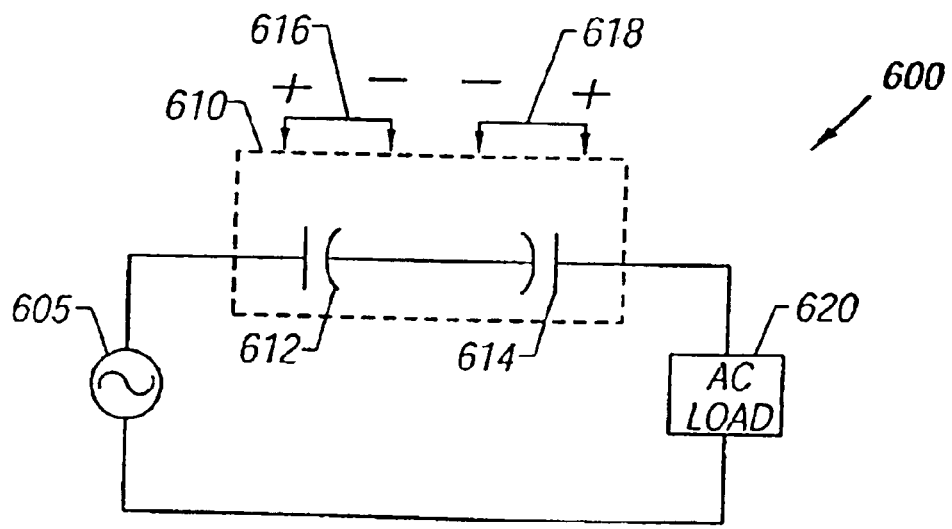
FIG. 6A shows an AC circuit comprised of forwardly biased, anti-series polarized capacitors, of the present invention, neglecting the DC bias circuitry details.

FIG. 6A shows ideal circuit 600, which conceptually illustrates an embodiment of the present invention. Circuit 600 includes AC source 605 connected in series with an anti-series, polarized capacitor pair 610 and load 620, which is driven by AC source 605. Polarized, anti-series capacitor pair 610 includes polarized capacitors 612 and 614 connected in an anti-series relation to one another. As shown in FIG. 6A, capacitors 612 and 614, are each suitably and forwardly biased with DC voltages 616, 618 so that a net positive potential is continuously impressed across each capacitor thereby allowing them to be used in general AC applications.

Each DC biasing voltage is large enough in connection with each capacitor's operational AC voltage share to compensate for the worse case negative AC swing. The positive swing of the AC voltage superimposed on the DC bias voltage is similarly less than the capacitor's rated working voltage. The forced, continuous DC bias condition eliminates the prior art disadvantages of intractable heat loss, short life, signal distortion and/or an oscillatory DC bias voltage condition. Thus, when the proper DC bias condition is maintained and the AC voltage and current are small relative to device tolerances, this circuit is suitable for steady state and/or transient AC operation. The details of the DC bias superposition circuitry are omitted for simplicity in this drawing but will be addressed in greater detail below. There are many circuit realizations suitable for establishing and maintaining the proper DC capacitor bias condition. The DC sources for biasing anti-series, polarized capacitors may be derived from any suitable scheme including both regulated and unregulated sources. Alternatively, note that instantaneous active biasing is practical and can increase life of polarized capacitors.

Circuit 600 exploits the DC blocking characteristics of the capacitors 612, 614. DC voltages 616, 618 are impressed upon the terminals of the two polarized capacitors. For the purposes of this discussion, it is assumed that a symmetrical DC bias voltage is impressed. For simplicity sake, it is also assumed that capacitors 612 and 614 are equal in capacitance to one another. However, these conditions are not required for the present invention. In this embodiment, the value of each DC bias voltage is at least one half of the absolute maximum (not RMS) peak-to-zero AC voltage across the anti-series pair of capacitors. This is one quarter of the impressed peak-to-peak voltage magnitude. To account for component variation and maintain the small signal regime, the applied DC bias voltage would be increased somewhat. The DC bias voltages do not adversely affect the AC operation of the circuit. This provides proper forward biasing, and permits continuous operation without the AC voltage distortion, capacitor reverse biasing, diode forward conduction, component heat build up, DC reference voltage oscillation and premature failures characteristic of prior art applications.

In an ideal configuration, the DC bias sources are electrically isolated from (or independent of) the AC source. Accordingly, no instantaneous DC bias voltage or current will disturb the connected AC network in this ideal case. In addition, no harmonic or sub-harmonic distortion would be imparted to the AC network, by either the capacitive AC current path, or the bias source. Moreover, this DC bias source exhibits infinite bi-directional AC impedance and zero DC resistance. Similarly, the AC current path through the polarized capacitors exhibits zero bi-directional AC resistance and infinite DC resistance. The AC and DC voltages are present in accordance with the principle of superposition. Thus the AC/DC interface causes no electromagnetic disturbance to each other, or to adjacent electrical equipment. The polarized capacitors can be considered to be the DC load for the DC power supply in both the AC transient and the AC steady state case.

The simplicity of circuit 600 is informative. It serves, mainly to illustrate that polarized capacitors can be directly employed in AC networks, and serve as an AC voltage divider. This constitutes an elegantly simple realization of polar capacitor use in AC networks, and provides heretofore-unknown results. There is no possible AC electrical path but through the capacitors. Because the center node is biased relative to a fixed ground reference, the two alternate anti-series realizations can be operated in parallel with each other, with suitable bias voltage.

Figure 6B:
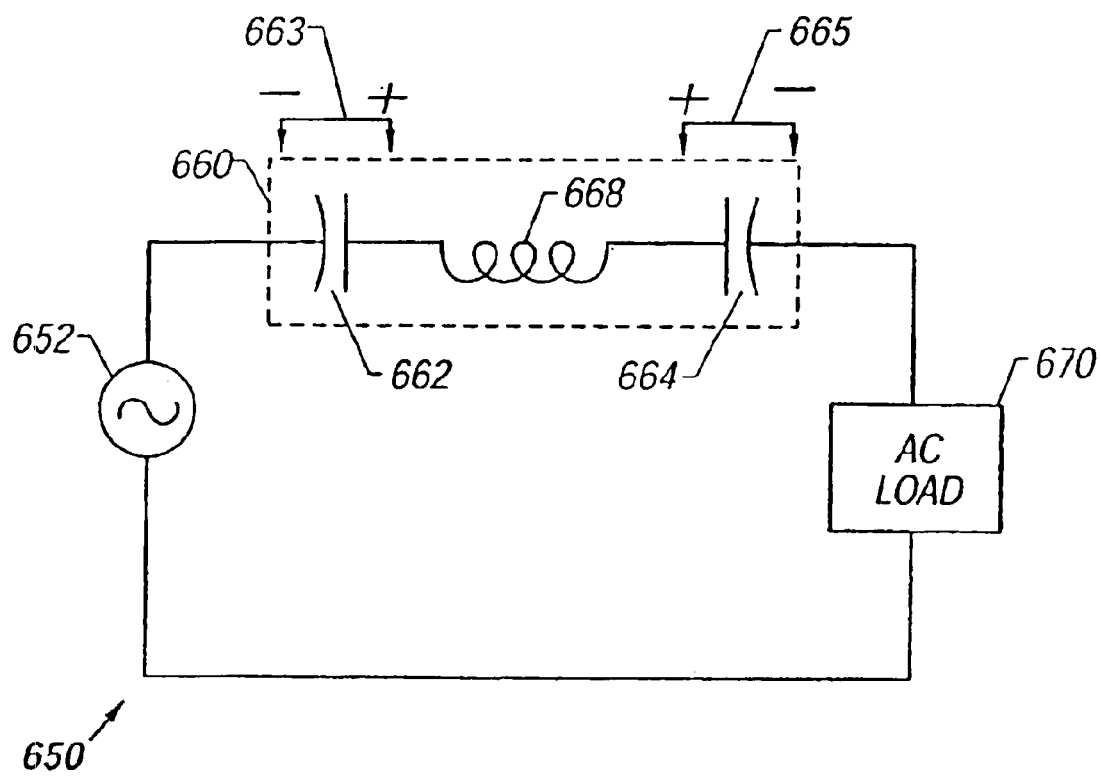
FIG. 6B depicts a forwardly biased, anti-series polarized capacitor configuration, of the present invention, with an AC device separating the positive DC junction node, with biasing details omitted.

FIG. 6B depicts circuit 650. Circuit 650 is composed of AC source 652, polarized capacitors 662, 664, inductor 668 and AC load 670. Inductor 668 physically separates the anti-series polarized capacitor pair 662, 664. Note that the polarity orientation and DC bias voltage of capacitors 662, 664 is reversed from that shown in FIG. 6A. The polarity marks above the capacitors indicate the continuous forward biasing of the capacitors. One can verify that in the steady state, the DC and AC voltages add to zero around the circuit. The steady state DC voltage across the inductor is negligible, thus the positive nodes of the capacitors have a virtually identical DC potential. Thus the DC junction node maintains continuity through the inductor. It is noted that AC source 652 and AC load 670 similarly physically separate the negative poles of the capacitors while remaining at the same DC potential. The AC source 652 is coupled to the AC load 670 by the LC circuit composed of capacitors 662, 664 and inductor 668. LC circuits are typically used as filters. The circuit AC parameters such as power factor, impedance and the like could be altered by adjustably controlling the inductance of the inductor. This could be accomplished by tap changing or shorting the inductor via a low resistance placed in shunt. The DC bias source details are omitted from the drawing for simplicity. This drawing serves to illustrate that AC circuit elements may separate forward biased anti-series PECS devices in an AC application.

Circuit Implementations

Figure 7:
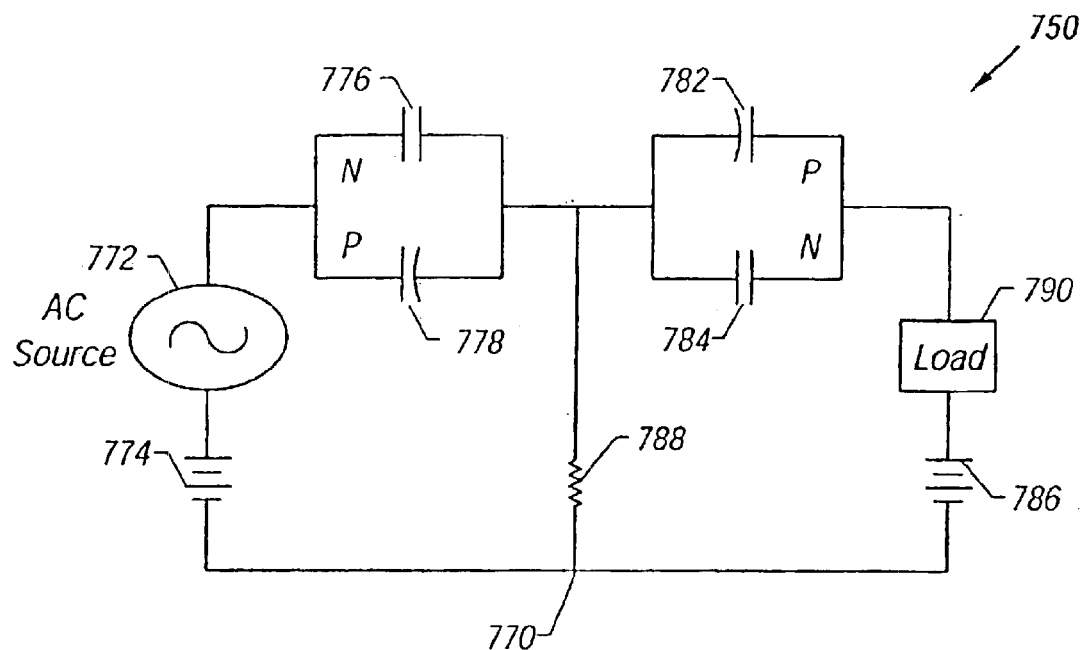
FIG. 7 illustrates an anti-series symmetrical implementation of DC biased polarized capacitors in a limited AC application of the present invention.

FIG. 7 shows circuit 750, which uses two explicit, identical DC voltage sources 774 and 786. Each ungrounded DC voltage source positively biases a polarized capacitor 778 and 782, respectively, through DC ground reference (AC blocking) resistor 788. Non-polar polishing capacitors 776, 784, are connected in parallel across polarized capacitors 778 and 782, respectively; to form corresponding capacitor sets 776/778 and 782/784. An AC signal is transferred from an AC source 772 through the capacitor sets to inductive/resistive load 790, and is conducted through the DC voltage sources output sections. The anti-series placement of the polar capacitors, together with the biasing, allows their use in this AC signal application. Both the AC source 772 output section and load 790 function as steady state DC short circuits, which allows the DC sources 774, 786 to bias the capacitor sets. The blocking resistor 788 provides a DC current path to the negative pole reference voltage level in this symmetrical, ungrounded DC biasing scheme. The resistor has sufficiently high AC impedance relative to the capacitors to substantially appear as an open circuit to the AC signal. This circuit embodiment serves primarily to illustrate the use of symmetrically biased anti-series polarized capacitors, to transfer an AC signal. The principal of superposition is explicitly portrayed. It is noted that a single, non-biased, non-polarized capacitor, from AC source 772 to load 790 can be substituted for capacitors 776 and 784 for more effective AC signal transmission polishing. It should be noted that the entire AC signal passes through the output sections of the two DC power sources. The DC voltage is divided between the capacitors and resistor 788. Note that the system can be arbitrarily grounded at any single node. The DC bias voltage level can be set much higher than the AC signal size for good signal transfer fidelity (low harmonic distortion).

Figure 8:
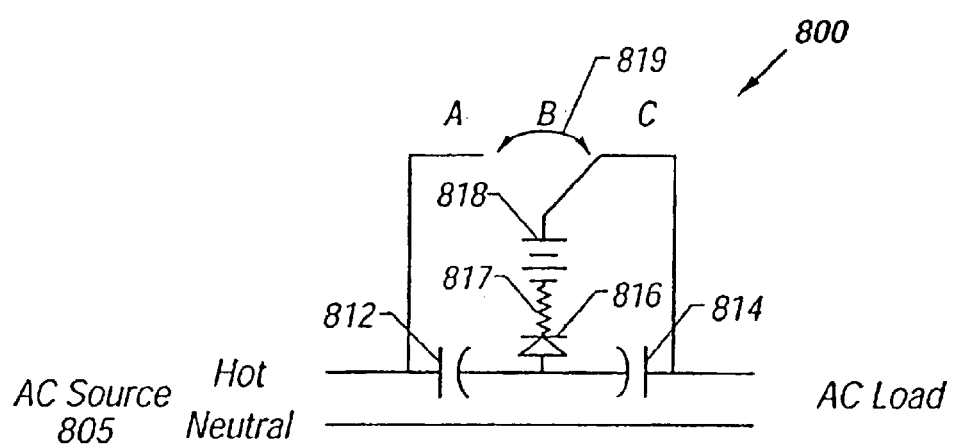
FIG. 8 depicts one circuit of the present invention.

FIG. 8 depicts circuit 800, which is one embodiment of a circuit for implementing the present invention. Circuit 800 includes AC source 805, anti-series polarized capacitors 812, 814, diode 816, resistor 817, DC voltage source 818, and three-position switch 819. The two wings of the anti-series capacitors 812, 814 may initially be properly biased sequentially. With the depicted circuit configuration, and the switch in the center position (open), a durable DC bias voltage and a close approximation to an infinite AC impedance (an open circuit) is achieved. However, the initially charged DC bias voltage will deteriorate due to the corona effect, and leakage currents through the capacitors. It is noted that the two wings maintain identical bias voltages and rates of charge decay. Thus, by throwing switch 819 back and forth, the capacitors 812, 814 can maintain their charge. Note that the typical AC source is fed to the load by a transformer wind. When the circuit is engaged, and the battery switch is thrown to either wing, the bias voltage of both wings rises with respect to the center node. The rate of change of the two voltages is different, but both increase. Shortly, the two wings have equal DC bias voltages. One, familiar with the art, can easily verify, that the transformer wind (AC source 805) and load have acted as a steady state short circuit, to the DC bias voltage difference. When the switch is in a lateral position, some AC current flows through the DC source 818 (e.g., battery). This non-ideality is unidirectional, temporary and dependent on the resistor 817 magnitude, capacitor, AC load and AC source parameters. In this case, an ideal circuit configuration works to any arbitrary degree. The switch is not necessary for circuit operation, but is useful to illustrate the principle of operation, and has utility for DC voltage source maintenance purposes.

Diodes in general (and diode 816 in particular) are an excellent realization of an high AC impedance, in the case of reverse flow, while allowing forward DC current to flow freely. Diode 816 does not block the forward AC current half wave. Switch 819 may alternately be realized as a solid-state switch or as an electromechanical device. Switch 819 can link the DC voltage source 818 to the appropriate capacitor 812 or 814, continuously, for a given half wave, or can simply intermittently connect to either side. The relatively large resistor 817 (or inductor) effectively links the DC voltage source 818 to capacitors 812, 814 while blocking the AC signal. Other high AC impedance circuit elements can however be utilized. Thus, the DC bias source is composed of electrical switch 819, DC voltage source 818, resistor 817 and diode 816. The extremely low AC resistance and relatively low AC impedance of the capacitors will effectively shunt the AC current. When the electrical switch is open, the positive pole of the DC bias source is electrically isolated from the positive terminals of the capacitors. In a typical AC network, the neutral line is connected to the system ground. The negative terminal of the DC bias source is connected to the negative terminal of polarized capacitors 812, 814. The DC bias source and the two polarized capacitors are in DC shunt with each other and maintain a different DC voltage level at their negative terminals than the hot, neutral and (if present) ground of circuit 800. Note that due to the presence of transformer winds in typical AC sources, hot neutral and ground wires are substantially at the same DC potential. This electrical isolation of the negative terminal of the capacitors from the AC is emphasized by the fact that neither an open circuit or dead short in the AC source and/or AC load will have any effect upon the DC bias voltage impressed across the capacitors. Similarly a dead short may replace the DC voltage source with no effect upon the DC reference voltage level of the AC lines, or upon circuit operation until the capacitor charge dissipates.

Figure 9:
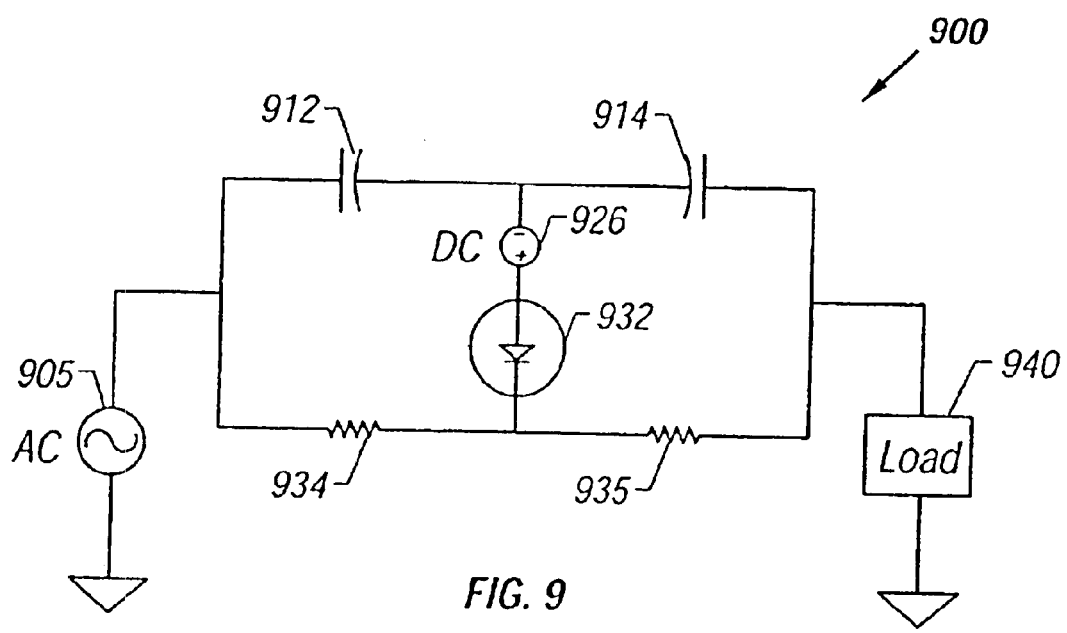
FIG. 9 depicts another circuit embodiment of the present invention.

FIG. 9 shows another circuit embodiment 900 of the present invention. Circuit 900 includes AC source 905, anti-series polarized capacitors 912, 914, DC voltage source 926, AC blocking diode 932, AC blocking resistors 934, 935, and AC load 940. The AC neutral and/or ground path is omitted from this drawing for simplicity. From an AC perspective, resistors 934, 935 are connected substantially in parallel across polarized capacitors 912 and 914 and for small, equal resistance values can correct AC volt division due to capacitor component variation. A positive DC bias is maintained across each polar capacitor with DC voltage source 926 through diode 932 and AC blocking resistors 934 and 935, which collectively function as the DC bias source. The DC bias source is substantially in shunt with the capacitors. Note that AC blocking resistors 934, 935 are substantially in AC series, and for large resistance values, prevent any significant AC current from bypassing the anti-series capacitor 912, 914 path. The blocking resistors 934, 935 in series combination with diode 932 prevent significant AC current flow through the DC source 926. Any suitable resistor size, e.g., from less than 40 Ω to, greater than 100 kΩ would be suitable for resistors 934, 935. Thus the DC bias source for circuit 900 is composed of DC voltage source 926, diode 932, and resistors 934, 935. Additional resistance may be placed in series with the DC voltage source 926 and diode 932 to decrease AC current through the source. In the steady state, the DC voltage source 926 is substantially in shunt with capacitors 912, 914 with respect to DC for typical component values. The selected capacitors may require a voltage rating that is at least double the value of DC voltage source 926 to allow superposition of a like magnitude AC wave across the capacitors.

If additional amps of AC current are desired, additional capacitors may be added in parallel across capacitors 912, 914. Additional biased anti-series capacitor banks, or series polarized capacitors joined in anti-series fashion, may also be added for increased AC current or voltage capacity respectively. A factor that will eventually limit the maximum Ampere rating of this scheme is the bias current requirements, that is, the power limits of the DC power supply. However, there is no intrinsic limit present in this case, as DC supplies can be constructed to any arbitrary size. Also, the DC power requirements are typically a small fraction of the AC power rating of the present invention. If DC voltage source 926 is a voltage-regulated source, electrochemical batteries in anti-series arrangement may be substituted for the capacitors 912, 914. Several battery cells in series per wing will be required, and charge/discharge DC bias voltage windows considered, but the realizable capacitance gain is massive. Thus with simple application specific design steps, any PECS device may be adapted to use in this circuit.

As a practical matter, it is conventional within the art of electrical manufacturing to separately fuse banks of capacitors. This convention will likely be extended to separately bias and fuse the capacitor banks.

Figure 10:
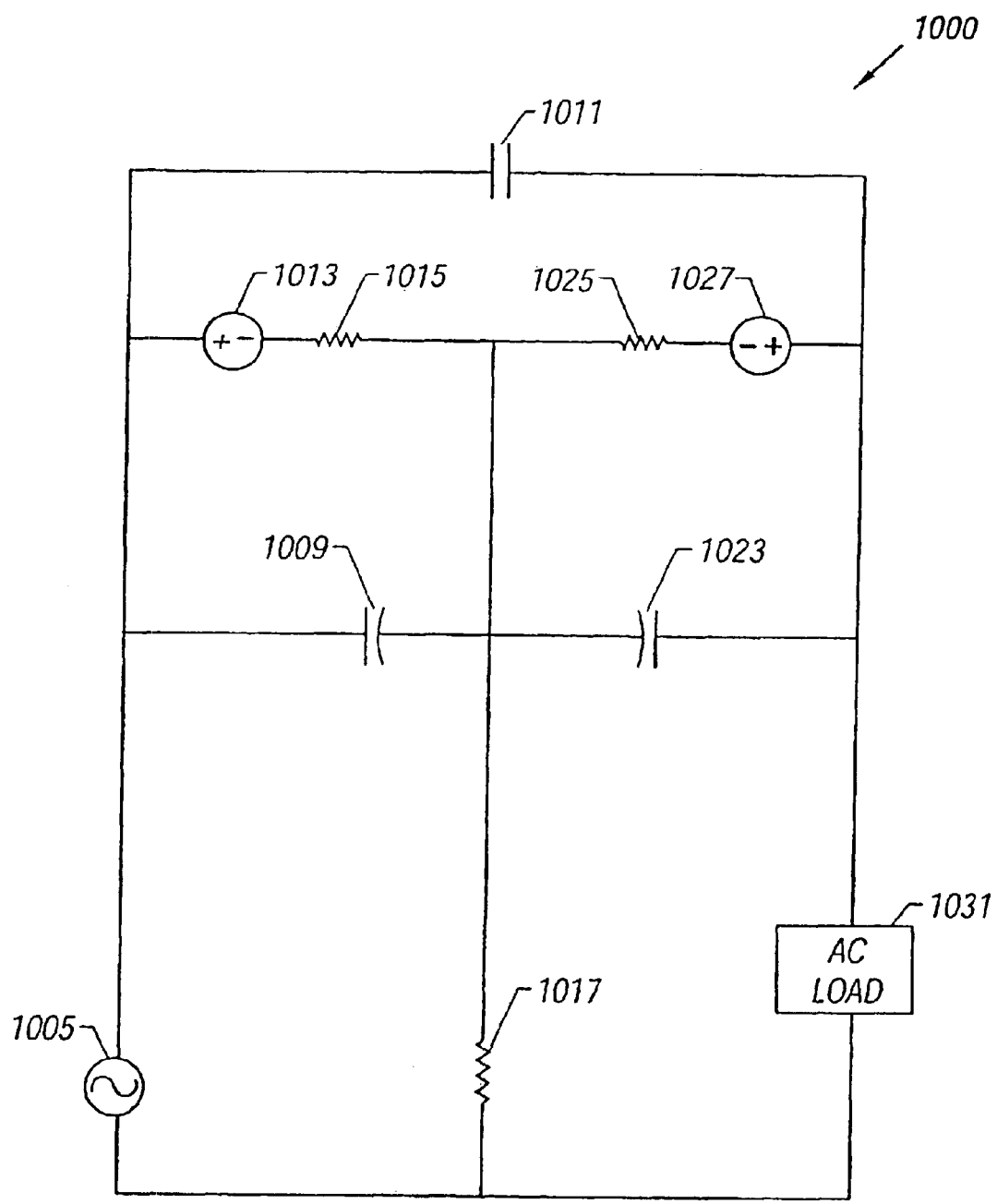
FIG. 10 shows one embodiment of a circuit for implementing the present invention.

FIG. 10 shows a circuit 1000 illustrating another use of biased, polarized capacitors in an AC network. An adaption of the circuit of FIG. 7, circuit 1000 provides a more practical solution for general AC power generation, transmission and distribution. Circuit 1000 comprises AC source 1005, anti-series polarized capacitors 1009, 1023, non-polarized polishing capacitor 1011, DC voltage sources 1013, 1027, AC blocking resistors 1015, 1025, 1017, and AC load 1031. A DC bias source composed of DC voltage source 1013 and resistor 1015 is substantially in shunt with polarized capacitor 1009. Similarly, a DC bias source composed of DC voltage source 1027 and resistor 1025 is substantially in shunt with polarized capacitor 1023. This circuit is similar to previously described circuits except that redundant DC biasing sources are connected directly in parallel across the polarized capacitors. This circuit has utility in general AC applications. Large impedance (Ω-kΩ) biasing (AC blocking) resistors 1015, 1025 allow DC biasing to occur while appearing as an open circuit for AC purposes. An inductor (or other AC open circuit device) may replace the biasing resistors 1015, 1025. The large (kΩ-MΩ) blocking resistor 1017 may be replaced by an open circuit. Similarly, blocking resistor 1017 may be relocated between the center nodes of the DC sources and the PECS device center node.

Figure 11:
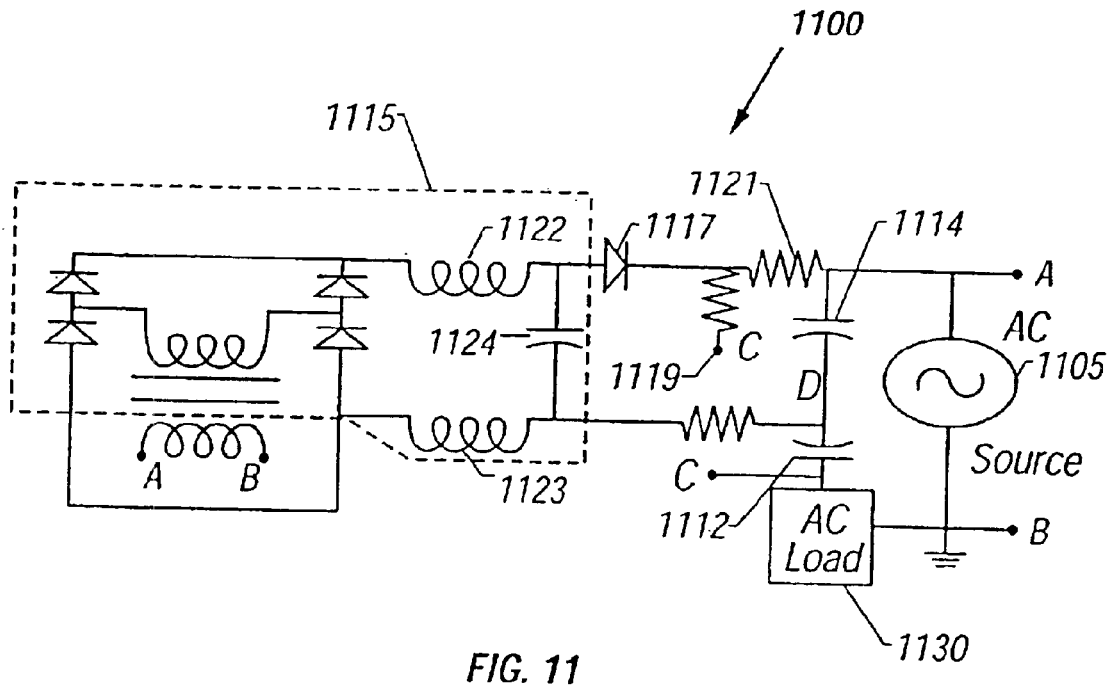
FIG. 11 illustrates a capacitive power coupling arrangement utilizing another embodiment of the present invention.

FIG. 11 illustrates a capacitive power coupling arrangement 1100 utilizing a single electrically isolated DC power supply 1115 to provide the necessary, symmetrical, active DC bias voltage for continuous operation of polarized capacitors in a general AC network application. Circuit 1100 generally includes AC source 1105, anti-series polarized capacitors 1112, 1114, DC voltage source 1115, blocking diode 1117, bias resistors 1119, 1121 and AC load 1130. Electrically isolated non-regulated DC voltage source 1115 is composed of an isolation transformer, full wave Diode Bridge and an output section of two inductors and a polarized capacitor 1124. The DC bias source consists of DC voltage source 1115, diode 1117, and resistors 1119, 1121. An optional and unnumbered resistor is shown in the DC bias source negative leg. The bias resistors 1119, 1121 and diode 1117 provide high AC impedance while allowing a satisfactory DC charging current to the polarized capacitors 1112, 1114. Diode 1117 further prevents a back flow of DC current in the event of diode bridge failure in the DC power supply. The DC power supply output section consisting of inductors 1122, 1123, capacitor 1124 as well as diode 1117 may be omitted without compromising function. Capacitors 1112 and 1114 constitute the steady state system DC load and are in shunt with respect to DC, but are in anti-series with respect to AC. The isolation transformer turns ratio within the DC power supply sets the DC bias voltage level and is operably connected to the AC source 1105. It is noted that the DC reference voltage level of nodes A and B are substantially at the AC system ground, while node D is held below ground by the DC bias source. The electrical isolation of the DC voltage source from the AC source would allow either orientation of capacitors 1112, 1114 to be used. That is the capacitor positive poles could be connected at node D, provided the bias power supply polarity is reversed. In that case, the node D reference DC voltage would be above the AC system ground level.

The power delivered to the AC load may be many orders of magnitude larger than the power requirement of the biasing power source. The AC source 1105 is assumed to include one or more inductive winds, e.g., from a generator or transformer. This provides a steady state DC short circuit. The superimposed AC wave and DC bias voltage should be less than the capacitor rated DC voltage, yet maintain positive biasing at all points in the AC voltage waveform. The magnitude of the DC bias voltage significantly exceeds the impressed AC voltage waveform magnitude to reduce harmonic distortion of the AC signal. The reference voltage level at point D, representing the negative capacitor poles, is maintained below ground in the single-phase AC system shown. It should be noted that the magnitude of the DC leakage current through the capacitors is minuscule. The DC voltage level of the AC source and AC load is taken to be virtually identical to the AC system ground. Thus, the polar capacitor negative connections are below system ground in this realization. In addition, the polarity of the capacitors and DC bias source can be simultaneously reversed. This reversal would raise the polar capacitor positive poles above the ground reference but has no significant first order effect upon the AC power transfer. Moreover, multiple, parallel, circuits with unique (or alternatively, a common biasing voltage) can be employed. This demonstrates that negligible steady state DC biasing of the AC circuit occurs. The selection of anti-series orientation selection may be related to capacitor case grounding, safety, convention, cooling, transfer function and other secondary considerations and issues.

The resistor 1119 connecting to node C, the resistor in the negative DC leg and resistor 1121 provide instantaneous symmetrical DC biasing of the capacitors. It is noted that typical inductive and resistive AC loads and sources provide a DC short to the system ground. It is physically allowable to place the AC load, or alternately the AC source between the polarized capacitors. It is preferred that both sides of a load on/off switch (not shown) be resistively connected to the DC bias source in this realization. This configuration provides a method for operating the AC source and AC load at different DC ground reference points. It is noted that until the resistors are connected to nodes A, D and C, the DC bias voltage source is completely independent of the AC system ground at node B. This is due to the AC isolation transformer and the full wave Rectifier Bridge. The necessary condition of continuous DC biasing can be supplied with half wave rectification, but ½ fundamental frequency harmonics are then injected into the AC network.

An electrically isolated regulated DC power supply with or without battery can be employed where desirable. Similarly, the bias voltage can be coupled to the polarized, AC signal carrying capacitors with inductors or other low DC resistance, high AC impedance circuit elements. The output section of the DC voltage source 1115 as well as diode 1117 may be eliminated, allowing resistors 1121, 1119 and capacitors 1112, 1114 to serve as a simplified output section.

Figure 12:
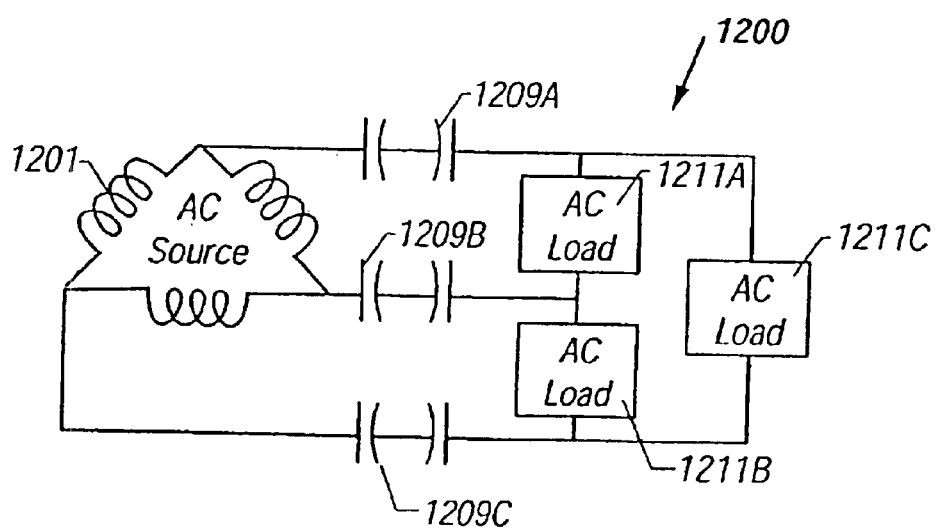
FIG. 12 shows a three-phase, three-wire AC system series depiction incorporating forwardly biased, anti-series polarized capacitors, of the present invention, neglecting the DC bias circuitry details.

FIG. 12 illustrates circuit 1200, which generally shows a three-phase, three wire AC system incorporating an embodiment of the present invention with the DC biasing details omitted. Circuit 1200 includes three-phase source 1201 (shown in a Delta configuration), forwardly biased anti-series polarized capacitor pairs 1209A–1209C, and a three-phase AC load 1211, which includes loads 1211A–1211C. For a properly biased, high AC impedance biasing system, this is an appropriate engineering approximation. The AC parameters of the biased polar capacitor assembly are sufficient for AC circuit analysis. It is clearly unnecessary to show DC details in AC circuit models for this purpose. FIG. 12 is thus a three-phase version of FIG. 6A with the bias voltage indications omitted. The known characteristic of DC voltage blocking in capacitors renders biasing details unnecessary for AC circuit analysis. If desired, however, the DC bias voltage level of the system can be noted for safety and maintenance purposes. Note that this is shown as a series application. If the AC load shown is a current limiting device such as a 3Φ resistor then this combined load becomes a shunt power factor correction device for other AC loads on either side of the source transformer. This device can be hard-wired or controllable. If the indicated load performs useful work, then power factor correction is accomplished without an increase in system Wattage. Any circuit capacitance constructed according to the process described herein will substantially exhibit terminal characteristics of a non-polar capacitor as seen from the AC source. The schematic is thus spared unnecessary detail in design, analysis and trouble shooting. The details of the polarized capacitor implementation can be referred to as necessary. An alternate schematic with reversed curves and lines could be used to show opposite capacitor alignment if desired. Other polyphasic configurations, including nine phase and the like can be similarly represented. It is noted that one could omit a capacitor antiseries pair, such as 1209B in the event network operating parameters required it. The negative poles of capacitors 1209A, 1209C could still be biased below the level of the AC source and loads.

Figure 13:
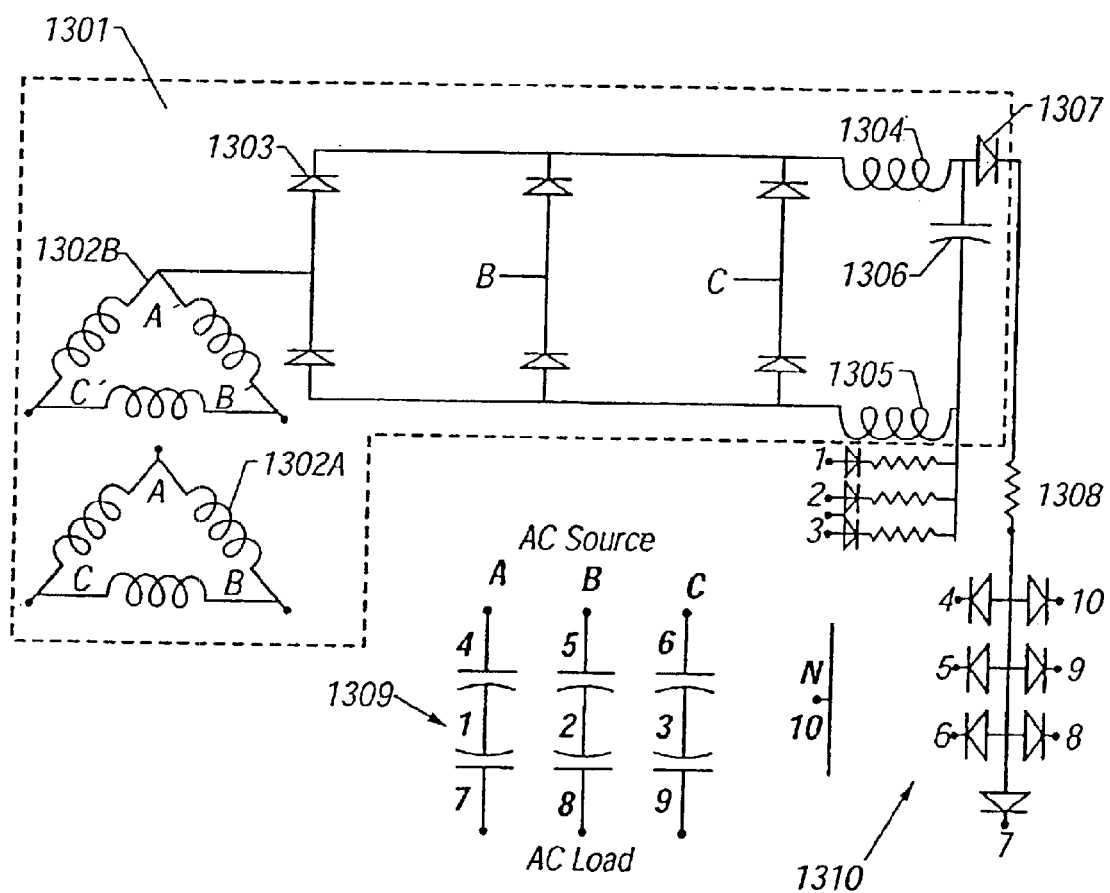
FIG. 13 shows a three-phase, four-wire AC system incorporating an embodiment of the present invention.

FIG. 13 shows a 3 phase, four-wire AC system with a 3 phase, electrically isolated, unregulated, DC power supply for capacitor biasing. The three phase DC power supply (DC voltage source) 1301 is used to forwardly bias polarized capacitor pairs 1309 pursuant to the present invention. Power supply 1301 generally includes transformer primary 1302A, transformer secondary 1302B, Diode Bridge 1303, chokes 1304 and 1305, and polarized capacitor 1306 and diode 1307 in this example. The DC power supply together with resistor 1308, the diodes associated with nodes 4–10, and the diode, resistor combinations associated with nodes 1–3 comprise the DC bias source. Diode Bridge 1303 is a three phase, six pulse, full wave device. Diode/resistor series elements connect the DC power supply negative leg respectively to polarized capacitor center nodes 1, 2 and 3 as shown. The DC power supply positive leg is connected via resistor 1308 and diodes 1310 (diode #s 4–10) to polarized capacitor nodes 4–9 and to the system neutral wire 10. The anti-series diodes 4 and 7 block AC current from the A leg, while DC biasing the anti-series capacitors through the above listed center node 1. The B leg and C legs are similarly DC biased. AC current is fed from the source to the load through the DC biased anti-series capacitors in the A, B and C legs. As shown the A, B and C legs of the AC source simultaneously feed the capacitors and the transformer primary. The vast majority of the AC power is delivered to the AC load. Other, polyphasic AC system capacitor coupling circuitry may be similarly realized. As indicated previously, the illustrated realization of the bias DC power supply is arbitrary. Particular applications may require alternate DC power supply realizations for optimal long-term performance. Typically in AC systems, neutral node 10 would be grounded at a single point via a hard ground, grounding resistor, inductor or capacitor. Note that the design electrical isolation characterizing DC voltage source 1301 loses some effect when connected to the AC source, polarized capacitors, AC load and system ground if present.

The primary side Delta transformer winds 1302A and the AC source (Wye, Scott Tee) winds provide redundant paths and mandate a unified system steady state DC reference voltage at nodes 4–10. Inductors 1304, 1305, diode 1307 and resistor 1308 prevent conduction of system (block) AC current through the DC power supply. The PECS device center nodes 1, 2, 3 are held at a lower DC potential by DC source 1301 providing for a substantially uniform PECS device DC bias voltage. This DC bias voltage magnitude is unaltered by the AC system grounding convention. Note that a single DC source is biasing the three PECS device pairs shown in 1309. These capacitor pairs are substantially in DC shunt, yet are in three separate AC legs. In fact, each wing of each capacitive pair is substantially in DC shunt with DC source 1301.

Figure 14:
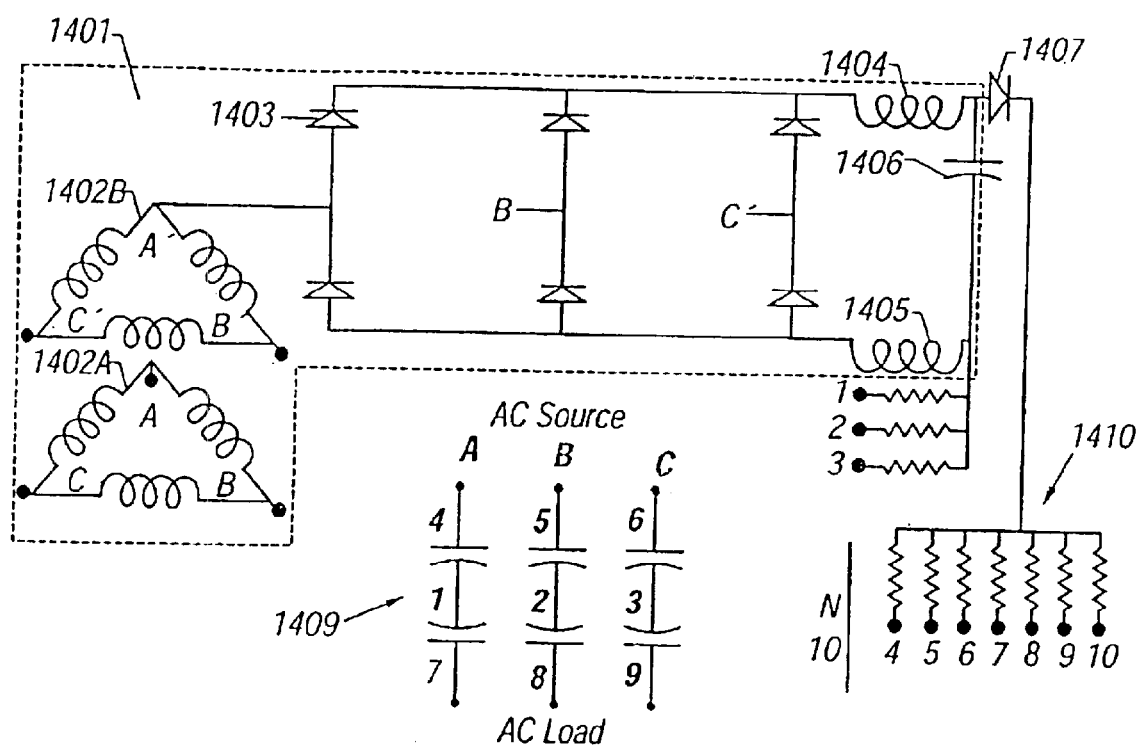
FIG. 14 shows an alternate three-phase, four-wire AC system incorporating another embodiment of the present invention.

FIG. 14 shows an alternative three phase, four wire AC system with a three phase, ungrounded, unregulated, DC power supply 1401 for biasing polarized capacitors 1409. In place of a diode manifold (1310) a resistive manifold 1410 is instead used in the illustrated embodiment. In a standard engineering approximation, order of magnitude differences in impedance are functionally similar to the previous circuit. The capacitive AC impedance is low, so that 500[Ω] AC resistors will exhibit essentially the same terminal behavior, in a 120:208[VAC], 60 Hertz system as the AC current blocking diodes of the previous circuit. This circuit exploits the milliOhm (mΩ) ESR of the capacitors in shunt with the 500[Ω] resistor connected nodes 1–10 to effectively direct the AC current through the capacitors rather than the DC circuitry under the convention that electricity follows the path of least resistance. All the components shown except 1409 compose the DC bias source in this example. An alternate method of biasing is used to illustrate that many such high AC impedance biasing schemes may be constructed to accomplish the ends of the invention.

Figure 15:
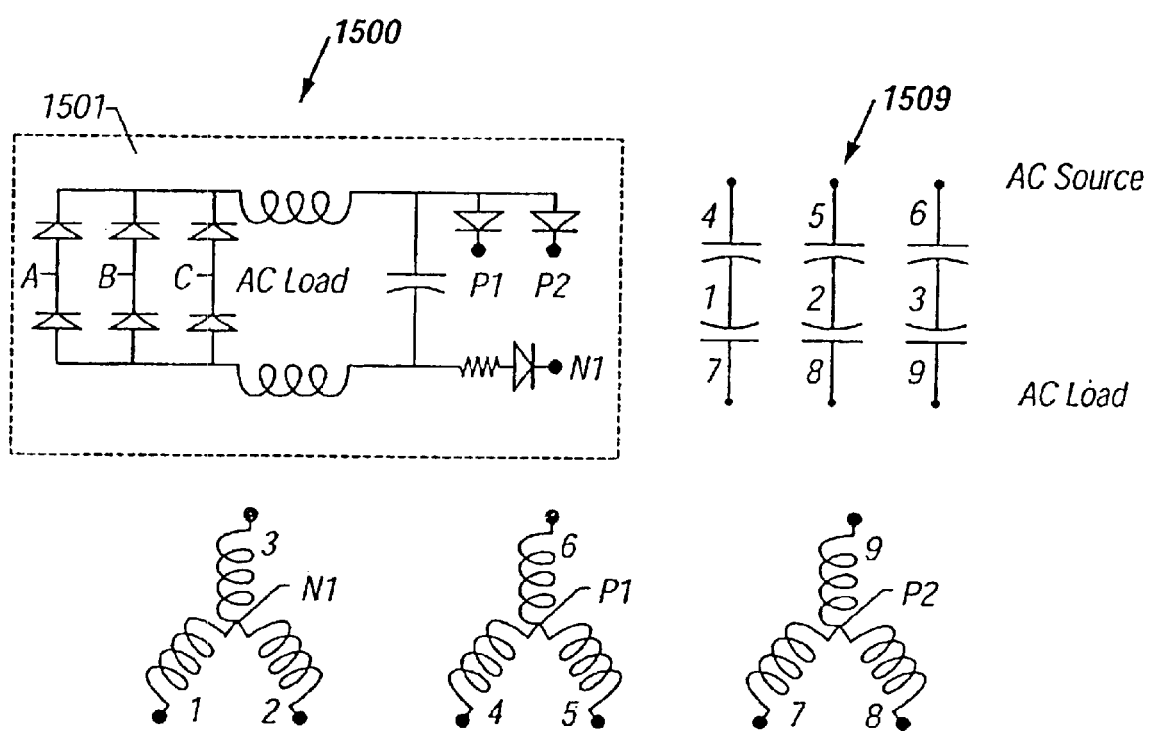
FIG. 15 illustrates an additional three-phase, four-wire AC system incorporating an embodiment of the present invention.

FIG. 15 illustrates an alternate inductive method of biasing the polarized capacitors previously shown in FIG. 13 and FIG. 14. FIG. 15 is composed of series AC source, load and antiseries capacitors labeled 1509, three discrete three phase inductor coils and DC voltage source 1501. The DC voltage source positive leg is connected to output diodes P1 and P2, while the negative leg is connected to current limited diode with output N1. Along these lines, it should be clear to those, familiar with the art that many additional biasing schemes are suggested herein. Note that output N1 is connected to the polar capacitor negatives via inductors at nodes 1–3 while P1 and P2 are connected to the capacitor positive poles 4–9, in this three phase, three-wire (delta) AC system labeled 1509. Series resistive elements in the DC path may be added to further reduce AC current through the DC source. Also note that the rectifier isolation transformer is omitted from the schematic for simplicity. Properly selected, high impedance inductors or transformer coils can thus be used to couple the DC voltage source to the polarized capacitors while providing AC blocking utility.

This phenomenon gives rise to a caution. A magnetic coil or small resistance, placed across a DC bias voltage creates a short. This may cause a destructive, reverse voltage condition across the polarized capacitors if care is not taken. Reverse polarity hazards are well known to those familiar with the art. For this reason, the normal course should be to use the polarized capacitor assembly as a unit. High pass, low pass, band pass and blocking filters, tied to the center node, should be attempted with extreme caution for these same reasons.

Recall that motors and transformers have integral coils. Further recall that energy conversion equipment typically includes isolation transformers. Consider a distribution level transformer operating one or more AC motors, through the present invention, and other equipment in parallel. In this common case, inductor coils and resistor paths are present, on both the source and load sides of the capacitor bank. This is true for the hot lines for Wye, Scott Tee, High Leg Delta, Open Delta and Delta type connections, and for the neutral lines in the first three cases only. Also note that prevailing grounds in AC power systems are of the solid, resistance or inductive types. In the normal steady state operating mode, we thus have redundant DC bias paths to the conductors in typical single phase and polyphasic electrical networks. The internal nodes of the capacitor bank may be redundantly connected; however, due to the above condition, this will seldom be considered necessary for the external nodes.

Figure 16:
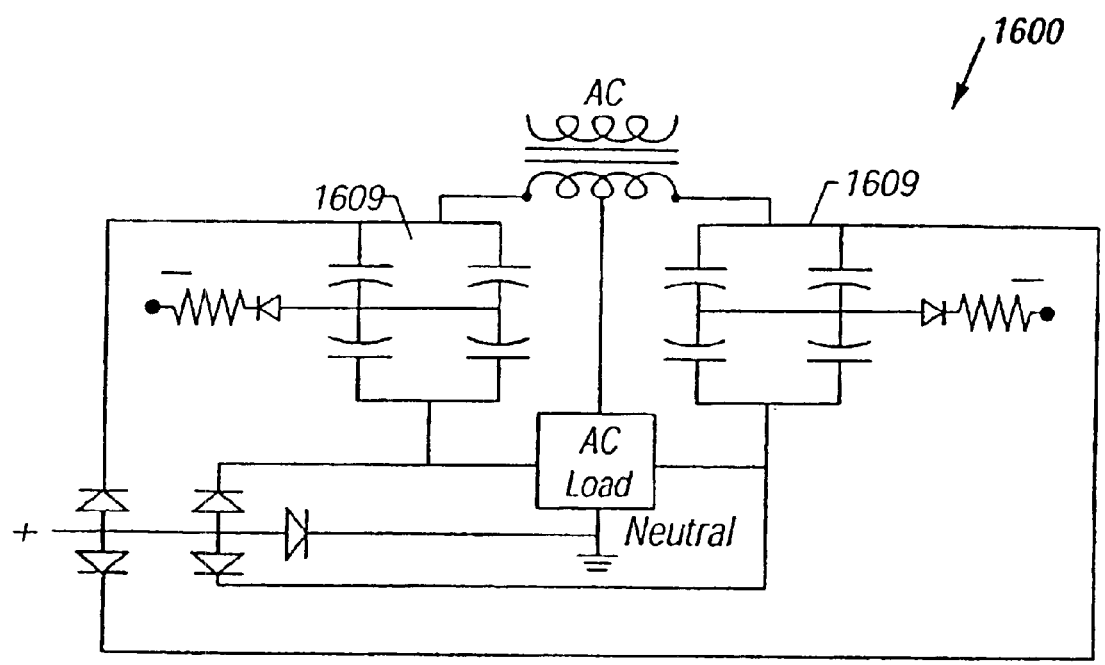
FIG. 16 illustrates one high current circuit with a 4n+ implementation of the present invention, omitting the details of the DC voltage source.

FIG. 16 illustrates circuit 1600, which provides an implementation of the present invention suitable for a 120:240 [VAC] single-phase system. This is the most common household AC power distribution scheme used in the United States. Note that an anti-series capacitor assembly 1609 is present in each hot leg, though a neutral assembly could be included. The capacitor assembly DC junction nodes are biased below system ground. The details of the DC power supply and AC current blocking are omitted from the schematic for simplicity. The AC system ground, neutral and hot legs are equi-potential surfaces with respect to steady state DC. Polarized capacitors are available with discrete AC ripple current ratings. Parallel capacitors or capacitor assemblies may be required to realize arbitrary AC current ratings. Transient (impulse & surge) and/or steady state current parameters may be used to determine the number and design of polar capacitors required in a given application. FIG. 16 shows a parallel assembly of capacitors constructed with each internal element in shunt. The parallel connections may be hard-wired or controllable. The AC loads for such an application may be powered by two or three wire 120 VAC, or by two, three or four wire 240 VAC. The center wind of the transformer and the load neutral wire is solidly grounded in this circuit.

Network parameters and goals such as resonance may be accomplished by switching in and out of banks of capacitors. This switching may be accomplished manually, electro-mechanically, or by solid-state means. In many cases, (including without limitation aluminum electrolytic capacitors), capacitance, series resistance, AC impedance, service life, dissipation factor and the like, may also be controlled by means of ambient and core temperature regulation. These capacitor parameters and capacitor life expectancy vary with core temperature and can be tuned somewhat by deliberate temperature variation.

It is desirable to maintain proper DC biasing of parallel units. It is also advantageous to provide high AC impedance and low DC resistance connections around the switching mechanism in the case of controllable switching units. Note also that the source transformer provides a redundant DC bias path to each branch of Circuit 1600, except for the DC junction nodes. The circuit of FIG. 16 can be made less susceptible to cascade failure by separately fusing the DC bias path to the wings and center nodes, as well as the AC path of each PECS device in the 120[V] legs of the 240:120 [V] output. The circuit of FIG. 16 may further be converted to an AC current divider circuit by separating the outputs and, if desired the center nodes.

Figure 17:
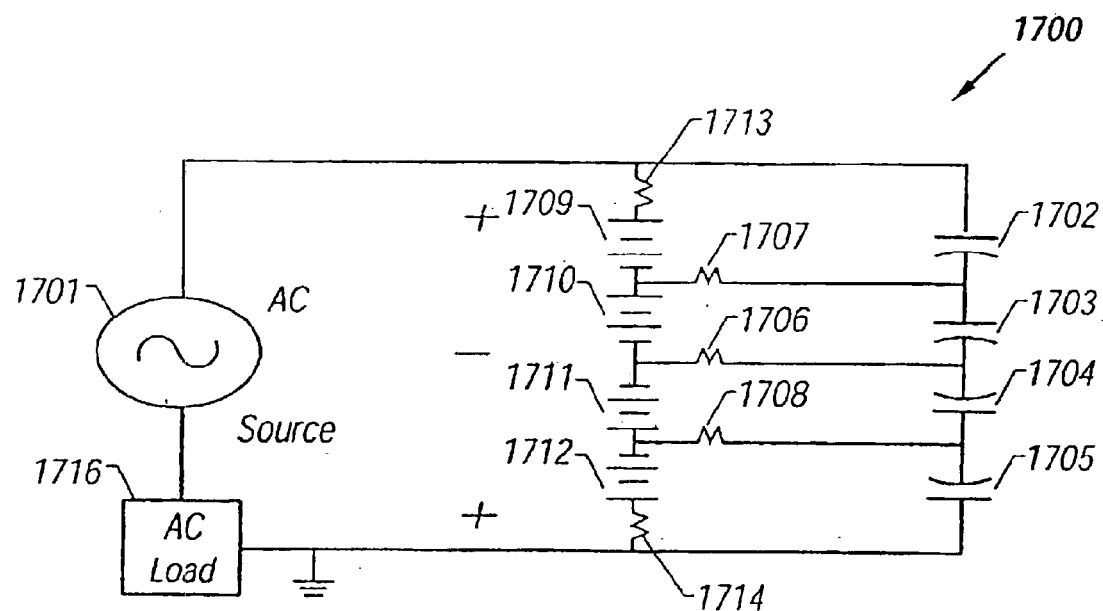
FIG. 17 shows a simple representation of a high voltage realization of a 4n+ polarized capacitor and biasing system of the present invention.

FIG. 17 shows a simple representation of a high voltage realization of a 4n+ polarized capacitor and biasing circuit 1700. Circuit 1700 generally comprises AC source 1701, anti-series polarized capacitors 1702–1705 and AC load 1716 as well as the DC bias circuitry. The DC bias source consists of resistors 1706, 1707, 1708, 1713, 1714 and DC voltage sources 1709–1712. Capacitors 1702, 1703 are in series, as are capacitors 1704, 1705. Capacitor pairs 1702, 1703 and 1704, 1705 are joined in an anti-series AC configuration. They are also substantially in DC shunt with one another. Thus the DC charging current, leakage current and bias voltage see parallel, two-capacitor configurations. The AC signal however passes through what is effectively a series configuration of 4 capacitors. This point is significant in determination of maximum capacitor voltages when taking component tolerance or error into account. This system can be extended to allow the construction of 6n+, 8n+ and higher voltage AC capacitors using polarized capacitors. It is noted that overall symmetry is maintained. In this particular implementation, the biasing voltage is explicitly externally divided. This is not essential but is illustrative only of one bias method. As is the case with other capacitor classes and types, the capacitors intrinsically act as a volt divider for both AC and DC within component error. A single DC voltage source or two DC voltage sources may be substituted with appropriate AC blocking devices and biasing considerations. Distribution resistors may be configured to provide suitable DC bias voltage division and improved AC voltage division across capacitors 1702–1705. This resistive biasing network can reduce the effects of capacitor component tolerance differences. AC network impedance, capacitance, equivalent series resistance and the like can be altered via the switching in or out of one or more capacitors in series or parallel. Aluminum electrolytic capacitor cases, as typically constructed for heat dissipation reasons, may be at the voltage of the negative pole, rather than system ground, a matter requiring a degree of caution. One other area of interest is that an exploitable asymmetry is present with respect to volt division of AC and DC. Scanning from top to bottom, three forward biased conditions exist. Like amounts of biasing conditions exist from bottom to top. Note that the same end of AC voltage sharing may be accomplished by two independent antiseries configurations of PECS devices as accomplished in this circuit with an anti-series configuration of series capacitors per wing. This alternate method provides for a lower DC bias voltage source and comprises a more extensive example of the principle of AC series topography concurrent with DC shunt topography. An example of the usefulness of the above observation, is that twenty five percent of the AC voltage impressed across the capacitor bank is present across any given capacitor. Within component tolerances and/or error, one can monitor the impressed AC voltage at a reduced voltage, and any electronics requiring biasing can be directly employed.

Series implementations of capacitors are avoided where possible in conventional electrical design. The primary reason is that two identical capacitors in series will exhibit half the capacitance of a single capacitor. This is a damning situation, with currently available AC capacitor technologies, due to the low level of capacitance economically realizable. This phenomenon is however insignificant, with the present invention. AC ripple current is normally the limiting parameter, of the present invention, rather than capacitance. The present invention provides an overabundance of capacitance herein via the use of PECS devices.

Figure 18:
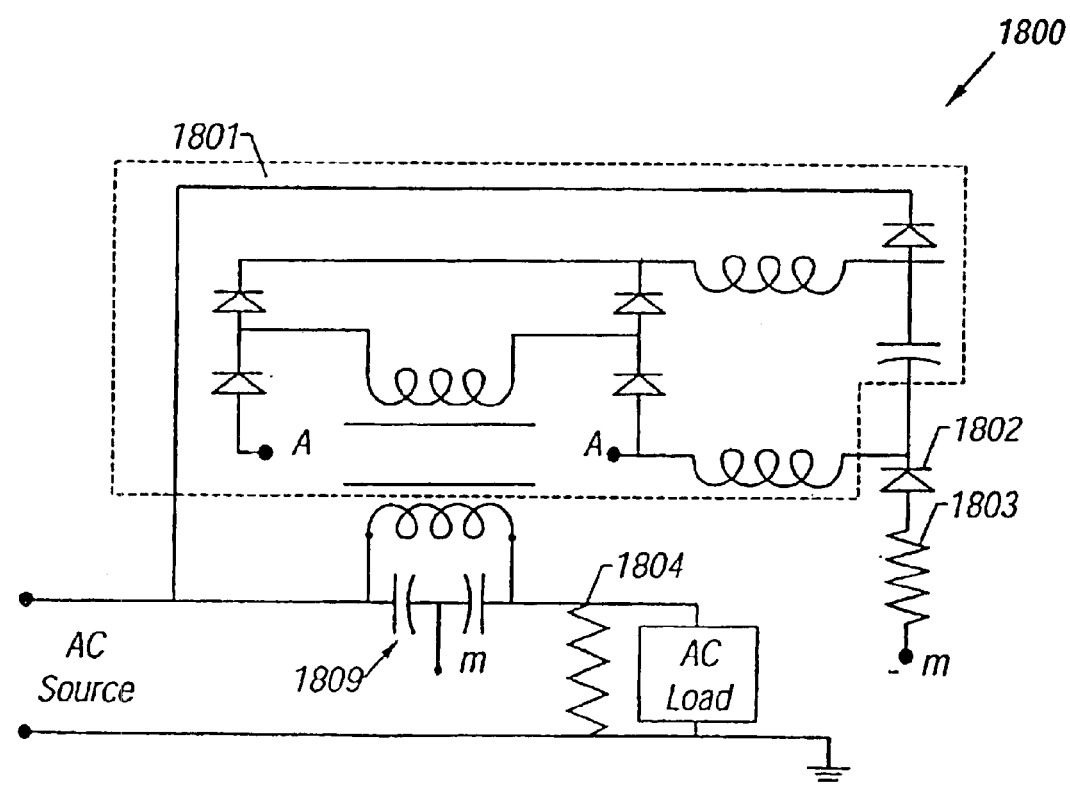
FIG. 18 illustrates an alternate, realization of the present invention.

FIG. 18 illustrates yet another realization of a circuit 1800 of the present invention. Circuit 1800 uses a variable DC voltage source 1801, whose value is proportional to the AC voltage across anti-series capacitor pair 1809, for forwardly DC biasing capacitor pair 1809. This ensures that anti-series capacitor pair 1809 remains sufficiently forwardly biased based on the size of the applied AC signal. The primary side, of the small isolation transformer shown; is energized by the voltage, across the mechanically anti-series capacitor assembly 1809. Note that the transformer primary side acts as a DC short to the capacitor positive poles. As discussed elsewhere herein, any inductor exhibits this physical characteristic. A primary to secondary transformer ratio of between 1:1 and 2:1 is suitable for 1Φ or 3Φ implementations of the depicted circuit. A full wave diode bridge, with filter, is coupled to the secondary side of the transformer. The electrically isolated, filtered output is then snubbed into the anti-series capacitors as a DC voltage supply. Resistor 1803 and diode 1802 serve as an AC blocking device and a DC bias connection from the capacitor DC junction node m to the negative pole of the DC voltage supply. As the capacitor AC voltage drop (impressed voltage) increases the DC bias voltage will increase. If the AC voltage drop across the capacitor decreases, the bias voltage will begin to slowly decay. Thus, this configuration has a feedback feature, and dynamically responds to a need for an increased DC bias voltage. A loading resistor 1804 is shown in shunt with the AC load. This is a pre-loading resistor and is widely used to improve voltage regulation, by those who are familiar with the art. This bias of FIG. 18 can be used to provide continuous forward bias for both capacitor wings. It is suitable for handling transient AC system resonant biasing requirements if the component ratings are appropriate. Various implementations may include resistance in the positive DC bias leg. Note that in many applications a redundant DC bias supply may be desirable. An effort to reduce component count is an object of the electrical design of FIG. 18. An analogous system may be constructed wherein DC electrical isolation is provided by capacitors.

Figure 19:
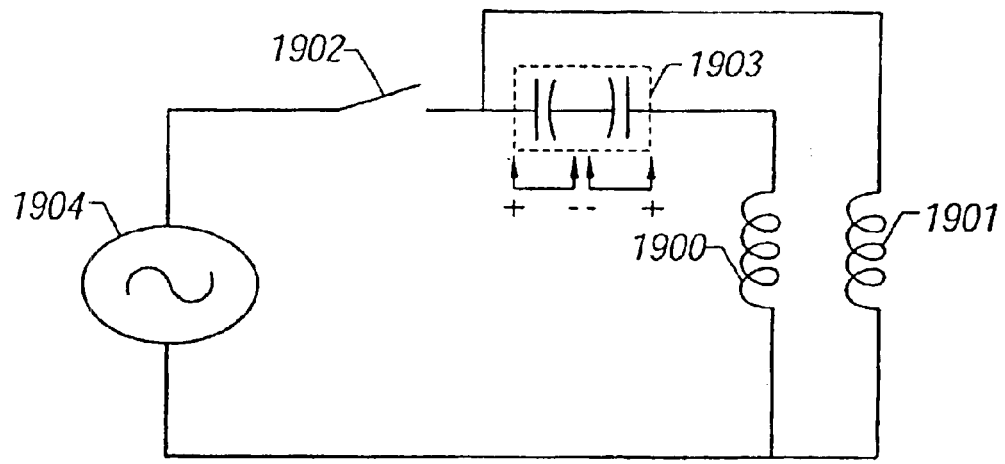
FIG. 19 depicts the two winds of a split phase AC induction motor suitable for continuous operation from a single phase AC source, employing an embodiment of the instant invention.

FIG. 19 shows a capacitor AC induction (or split phase) motor using a PECS device implementation of the instant invention. AC source 1904, switch 1902, PECSD pair 1903, and motor (stator) winds 1900, 1901 are shown. DC bias circuitry and rotor details are omitted. Motor wind 1900 is connected to forwardly DC biased anti-series capacitor assembly 1903. Motor (stator) wind 1901 is in shunt with the 1900, 1903 assembly. Switch 1902 is closed to connect the AC source 1904. Split phase (and/or capacitor AC induction) motors provide starting torque and a rotating field. The series combination of 1900, 1903 produces a unity or slightly leading power factor. This will cause the currents through coils (motor winds) 1900 and 1901 to be out of phase by approximately 90°. There is no need to disconnect the motor wind 1900 in that the instant invention is suitable for continuous duty. This 90° phase shift can cancel or reduce the 120-Hertz mechanical vibration (pulsation) characteristic of single-phase motors. Alternately the motor wind 1901 can be disconnected following startup. Either method can be used to configure a circuit, which is arbitrarily close to resonance during steady state and/or startup.

Figure 20:
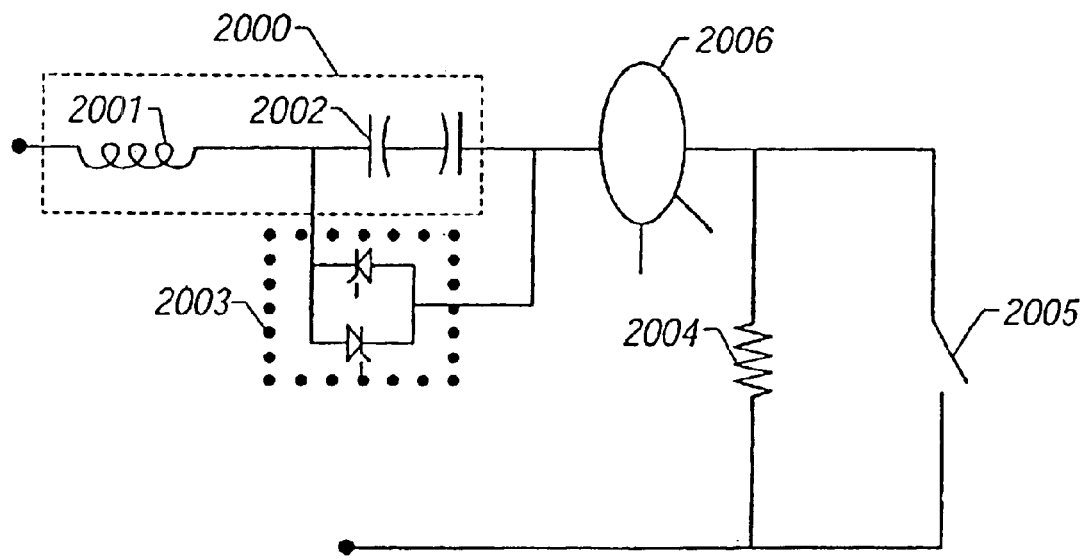
FIG. 20 shows a band pass LC filter with a detuning device for limiting currents caused by downstream faults in another embodiment of the present invention.

FIG. 20 shows tuned resonant series LC circuit 2000, composed of inductor 2001 and PECS device pair 2002 of the instant invention. Solid state (single sided static) switch 2003 composed in this drawing of anti-parallel thyristors (SCRs) is in shunt with 2002. Resistor 2004 depicts the steady state load. Series and/or parallel combinations of inductors and capacitors are typically referred to as LC circuits in the trade and are widely used for filtration purposes. DC bias details are omitted for simplicity. When a circuit fault condition is established by the closing of switch 2005, the current detector (torus) 2006 detects a rapidly increasing current. Alternately, a voltage sensing mechanism, ground fault detection or alternate methods can be employed to detect network fault conditions. This signal is operably connected to the solid state switch, via commercially available circuitry. When the static switch shorts the PECS device 2002 of the instant invention, the resonant band pass circuit of 2002 becomes profoundly inductive and current limiting. Commercial solid state switch response time is sub-cycle. Note that a switch similar to 2003 might be placed substantially in shunt across inductor 2001. This would provide the ability to tune steady state AC network parameters by shorting out the excess inductance. Similar tuning and detuning mechanisms may be constructed for shunt LC circuits and hybrid designs.

Figure 21:
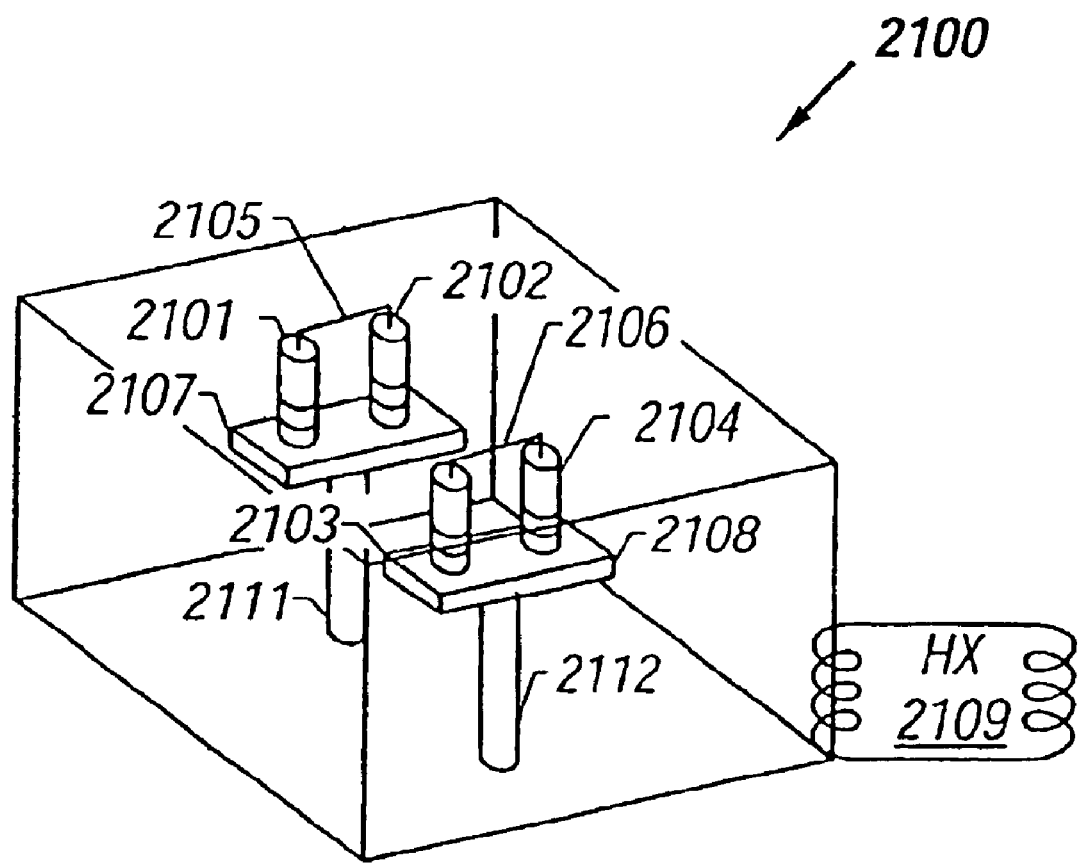
FIG. 21 depicts an electrically touch safe, thermally conductive structure for adjusting capacitor temperatures and electrical parameters in another embodiment of the present invention.

FIG. 21 depicts assembly 2100, which includes four polarized capacitors 2101 through 2104 mechanically suspended by non-conducting vertical strips 2111 and 2112, connected to conductors 2107, 2108. Capacitors 2101 and 2102 are in shunt via negative post conductor 2105 and conducting heat exchanger 2107, as are capacitors 2103 and 2104 connected by conductors 2106 and 2108. Positive pole capacitor busing and bias circuitry details are omitted for simplicity. For this example polarized capacitors with integral base bolts are selected for their heat conduction capabilities. Conductor 2107 is at essentially the same potential as conductor 2105 and the cans 2101, 2102. Similarly 2108 and 2106 and cans 2103, 2104 are at a virtual short in most commercially available large can electrolytic capacitors. The liquid dielectric (oil) level is above the conductors 2107 and 2108 for heat dissipation without the requirement of electrical connection considerations. The oil level may be raised above the capacitor cases to maximize electrical touch safety if dry connections and clear capacitor pressure vents are maintained. Mechanical tubing of a simplified external heat exchanger 2109 is shown. The simple design reveals a method of providing electrical isolation and temperature regulation for the steady state operation of PECS devices. The life expectancy of PECS devices and the capacitive parameters can be varied by the adjustment of the oil temperature. Electrical safety is provided by the insulating characteristics of the liquid dielectric and the insulating fasteners. The term 'liquid dielectric' is not intended to exclude insulation and heat regulation via gaseous or solid dielectrics with temperature conduction, convection, radiation and/or phonon transmission capability, and is illustrative rather than limiting. Various insulating fastening mechanisms and methods of maintaining good electrical contact in oil baths are familiar to those in the trade. An insulating cap, boot, seal, sleeve or vent exhaust tube and/or dry connection methods and products such as 'chico' and silicon are examples. This same end of enhanced cooling and electrical safety may be accomplished by increased airflow in a touch safe enclosure such as ingress protection IP-20 inside specifications. Integral heat exchanger designs may be used at 2107, 2108 and the enclosure to further enhance heat transfer efficiency. Note that the external heat exchanger 2109 may be connected to various heating and/or cooling mechanisms, such as water baths or heat pumps. The preferred implementation varies with the device power level, ambient temperature, optimal capacitor parameters, touch-safety and like considerations. In addition PECS devices and PECS device combinations may be constructed with multiple electrical polarities exposed to human touch for heat conduction reasons, via the can or alternately via heat exchanger enhancements. These designs add to the touch-safety issues, and further increase the utility of temperature regulation in combination with electrical contact safety considerations. Various manufacturing techniques employing 'can within a can' designs, various states of matter, mass transport and the like are expected to have significant utility in heat regulation for implementations of the instant invention. Similarly, direct insertion of a heat exchanger element into the capacitor case is feasible when electrical insulation design considerations are employed.

Figure 22:
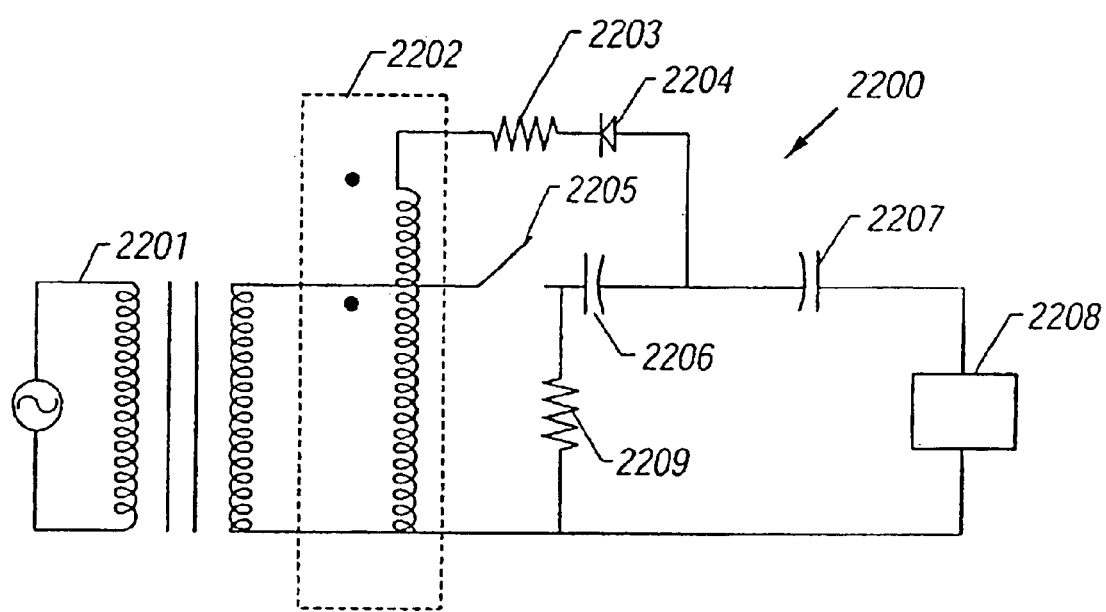
FIG. 22 illustrates a method for establishing a forward biased small signal transfer condition suitable for transient applications, and adaptable to continuous operation in another embodiment of the present invention.

FIG. 22 shows circuit 2200 composed of AC source 2201, autotransformer 2202, resistor 2203, rectifier 2204, switch 2205, polarized capacitors 2206, 2207 and AC load 2208. Autotransformer 2202 adjusts the system AC voltage to the charging circuitry composed of resistor 2203 and diode 2204 at other than the system AC voltage. An optional loading resistor 2209 connects capacitor 2206 to the charging circuitry. The charging circuitry will maintain the polarized capacitors at any arbitrary DC bias voltage until the load is engaged. It is also possible to achieve continuous operation capability by the use of a half wave or full wave Rectifier Bridge and other such methods. Alternate methods of achieving electrical isolation suitable for maintaining a continuous DC bias voltage across the polarized capacitors may be used. This system may be redesigned to provide DC electrical isolation by connecting the autotransformer to the AC power supply via two capacitors. It is further noted that the two capacitors may be an anti-parallel set of PECS devices. This method has capabilities in energy conversion applications such as rectifiers and inverters. The circuit may be self-biasing, that is without the requirement for control circuitry. This circuit primarily illustrates the use of an autotransformer in bias circuitry to achieve a selected bias voltage level. One may include tap changers, controlled rectifiers and the like to regulate the DC bias voltage level.

FIG. 23 shows AC source 2301, polarized capacitors 2302, 2303, controllable rectifier 2304, current limiting resistor 2305, loading resistor 2306, switch 2307 and load 2308. The controllable rectifier, such as an IGBT, transistor, cut off SCR or the like can be gated on or off to control the level of DC bias voltage. Half wave rectification is caused when AC current flows through capacitor 2302, rectifier 2304 and current limiting resistor 2305. The high impedance pre-loading resistor 2306 may be omitted. This circuit has the capability to build up and maintain a regulated capacitor bias charge, without over charging the capacitors. The details of the rectifier control circuitry are omitted, as such control circuits are available commercially and the design techniques are familiar to those in the trade. It is noted that this configuration will operate in the small signal regime, and is of use in transient and/or steady state operation. It is further noted that an uncontrolled rectifier (diode) can be substituted for 2304. The circuit will establish and maintain a DC bias voltage across capacitors 2302, 2303 substantially equal to the peak to zero voltage magnitude of AC source 2301. The steady state DC current through resistor 2305 is essentially equal to the DC leakage current of capacitors 2302, 2303.

FIG. 23A depicts a simplified circuit 23 to more clearly reveal the charging mechanism. The circuit elements are reordered to cut to the chase. When the controllable rectifier 2304 is gated on, one half wave, or a portion thereof causes a rectification current and charge build up across the capacitor 2302. Resistor 2305 or a similar device serves to reduce the transient (DC bias charging, half wave) current, and leaves the load (not shown) engaged. No significant steady state AC current flows through resistor 2305.

Figure 24:
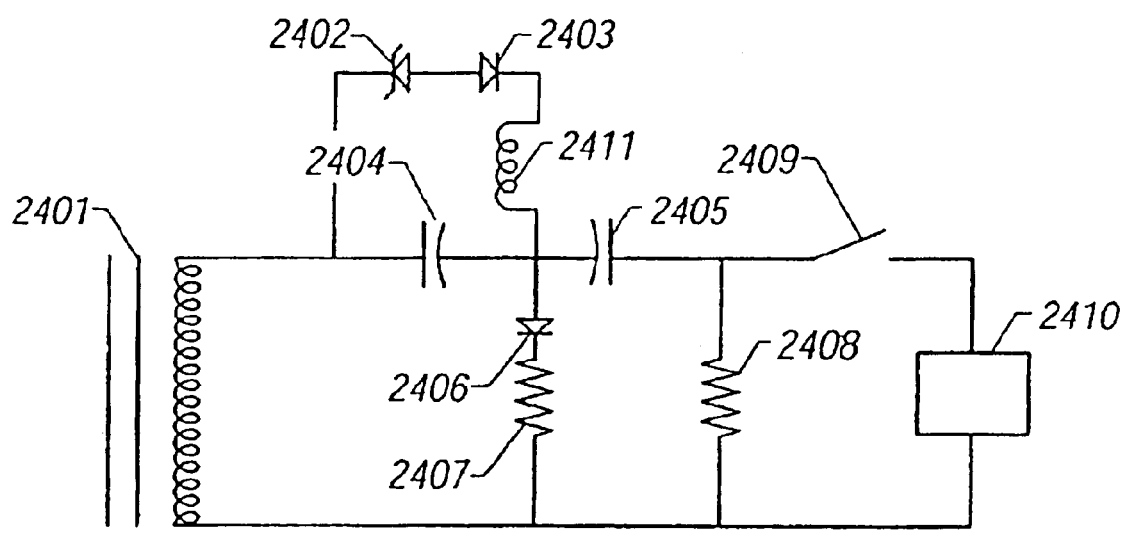
FIG. 24 depicts another embodiment of the present invention with a passive biasing circuit similar to FIG. 23.

FIG. 24 shows AC source 2401, zener diode 2402, diode 2403, polarized capacitors 2404, 2405, blocking diode 2406, blocking resistor 2407, optional resistor 2408, switch 2409, AC load 2410 and inductor 2411. This is a non-controlled version of the circuit of FIG. 23. The zener diode 2402 in anti-series with the diode 2403 and inductor 2411 will limit the capacitor bias voltage without the use of control circuitry. A portion of the excess DC bias voltage is conducted and dissipated through the zener diode 2402, diode 2403 and inductor 2411. It is noted that this configuration may sacrifice the ability to operate in the small signal regime, depending on selected component values. Also note that inductor 2411 may be replaced with a resistor or other suitable AC blocking, DC dissipating component.

Figure 25:
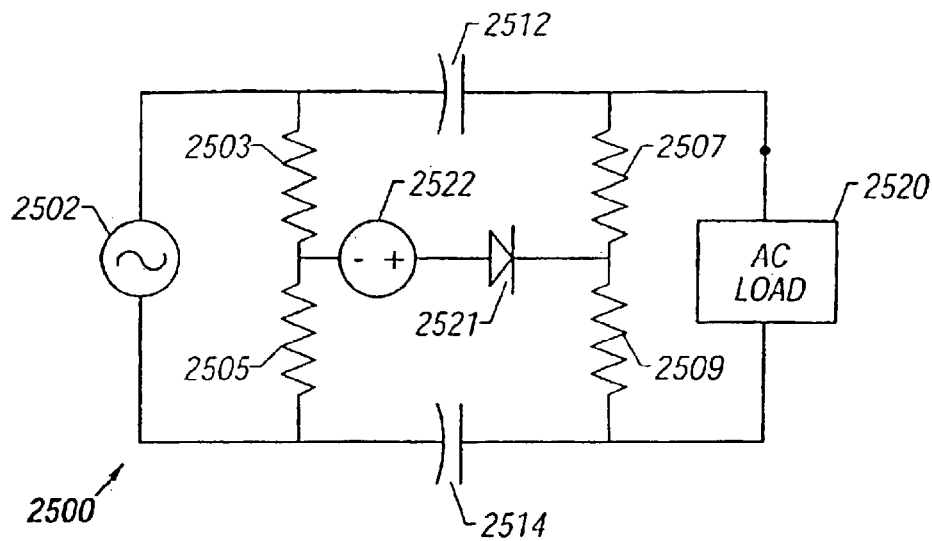
FIG. 25 depicts an antiseries configuration of the present invention wherein the AC source separates the negative capacitor terminals and the AC load separates the positive capacitor terminals.

FIG. 25 shows circuit 2500, consisting of AC source 2502, polarized capacitors 2512, 2514 and AC load 2520. Also shown is DC bias source composed of resistors 2503, 2505, 2507, 2509, diode 2521 and DC voltage source 2522 which functions even when the AC source or load are switched out of the circuit. The DC bias source establishes and maintains a forward bias voltage across the capacitors 2512, 2514. The resistors 2503, 2505, 2507, 2509 and diode 2521 will evenly distribute the DC voltage across the capacitors and prevent any significant AC current from bypassing the capacitors. It is noted that any single node of this circuit may be operably connected to a system ground. In this illustration, the AC load and the AC source will operate at different DC reference voltages.

Among other things, this circuit drawing illustrates that a configuration of anti-series PECS devices (polarized capacitors 2512 and 2514 in the drawing) can have more than one DC junction node. A first DC junction node, which includes AC devices 2507, 2509 at the positive capacitor connections, is coupled to the AC load, and a second DC junction node, which includes AC devices 2503, 2505, at the negative capacitor connections is coupled to the AC Source. The circuit further reveals that the capacitor orientation may be arbitrarily depicted as positive to positive, negative to negative, or with separating AC devices without having a first order influence upon AC power transfer in an ungrounded application in that the DC considerations have little relation to AC power transfer.

Figure 26:
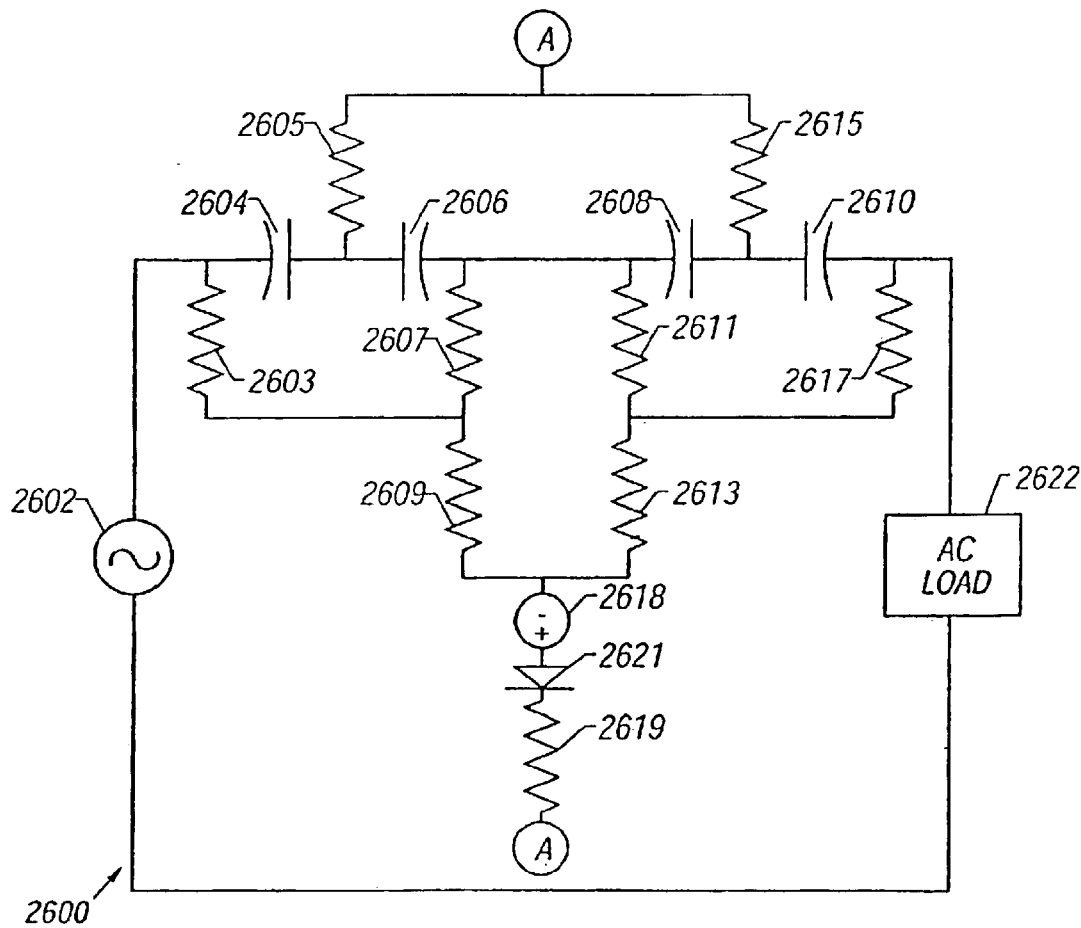
FIG. 26 illustrates the use of a single low voltage DC voltage source to bias two antiseries polarized capacitor pair, which are in series with each other., in another embodiment of the present invention.

FIG. 26 depicts circuit 2600, composed of AC source 2602, AC load 2622, and polarized capacitor pairs 2604, 2606 and 2608, 2610. The associated DC bias circuitry is powered by DC voltage source 2618 and conducted by series diode 2621 and series resistor 2619 and the associated distribution resistors 2605, 2615, 2603, 2607, 2609, 2611, 2613, and 2617. It is noted that resistors 2605, 2615 maintain a uniform DC voltage at the positive DC nodes of capacitors 2604, 2606 and 2608, 2610. Similarly the negative DC nodes of the capacitors are held at a common DC reference voltage by resistors 2603, 2607, 2609, 2611, 2613, 2617. Diode 2621 and resistor 2619 serve to block AC current from passing through the DC voltage source 2618. Point A shows the connection point to the upper bias circuitry. Properly selected resistor values may serve to reduce the effects of capacitor component variation in AC volt division. Circuit 2600 illustrates the use of a single low DC voltage source to bias two anti-series polarized capacitor pairs, which are arranged in a series fashion. Each of the capacitors is arranged substantially in DC shunt with the DC voltage source and the other capacitors. It is apparent that three or more anti-series capacitor pair, in a series configuration could be similarly biased by a single low voltage source with an appropriate bias voltage distribution network.

Figure 27:
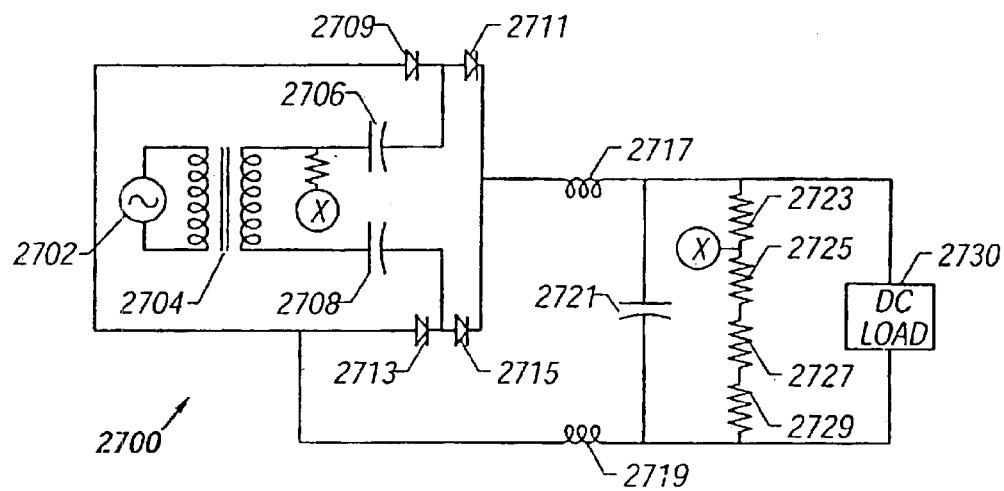
FIG. 27 illustrates a DC power supply, in another embodiment of the present invention, wherein a rectifier bridge is coupled to the AC supply via antiseries capacitors, which are in turn biased by a portion of the DC output.

FIG. 27 shows circuit 2700 including AC source 2702, isolation transformer 2704, and anti-series polarized capacitors 2706, 2708. Also included is a DC biasing source composed of thyristor bridge 2709–2715, coils 2717, 2719, bias resistors 2723–2729 and filter capacitor 2721 connected to the positive voltage pole of capacitors 2706, 2708 via node X. Not shown is a similar AC blocking connection of the DC negative output to the negative poles of capacitors 2706, 2708. The rectified output wave is filtered by inductors 2717, 2719 and polarized capacitor 2721 and conducted to DC load 2730. A small portion of the available DC power is used to forwardly bias capacitors 2706, 2708 when appropriate AC blocking devices connect the capacitor negative poles to the DC voltage source negative pole. This configuration illustrates the DC blocking feature of polarized capacitors in an AC application. Also shown is a method of putting the produced DC voltage to use in a common application, that of a battery charger or DC power supply. The anti-series capacitors are used to provide a DC voltage supply for general utility purposes. Alternately a separate DC bias source may be used to forwardly bias the capacitors.

Figure 28:
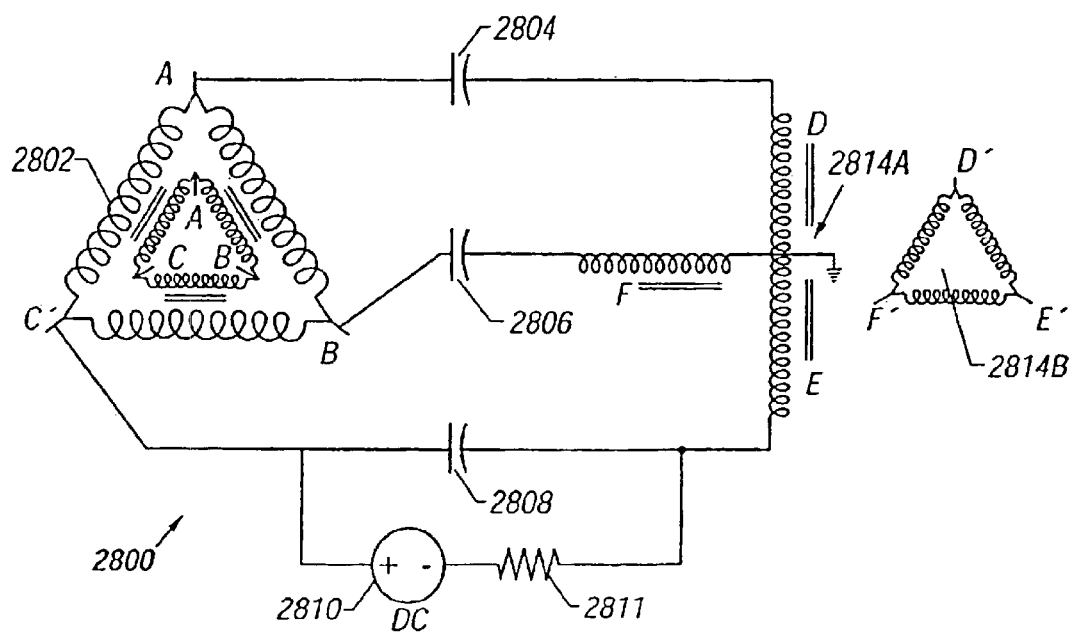
FIG. 28 shows a three phase antiseries PECS device configuration, in another embodiment of the present invention, wherein a single polarized capacitor is present in each AC hot leg.

FIG. 28 reveals circuit 2800. Circuit 2800 is assembled from three phase isolation transformers 2802, 2814 polarized capacitors 2804, 2806, 2808, DC source 2810 and resistor 2811. Polarized capacitors 2804, 2806, 2808 are in an antiseries configuration analogous to the single-phase circuits of FIGS. 25, 27. The appropriate forward bias voltage is impressed across capacitors 2804, 2806, 2808 through the DC junction nodes that incorporate inductors 2802, 2814. The DC bias source consists of an electrically isolated DC voltage source 2810 and series resistor 2811. The DC bias source is directly in shunt with capacitor 2808 and substantially in DC shunt with capacitors 2804, 2806. The inductor (transformer winds) on the prime side of 2802 impresses the positive DC bias reference voltage to the positive sides of capacitors 2804, 2806. Similarly the transformer wind of 2814A (the non-prime side) connects the negative capacitor poles to the negative pole of the DC bias source. Redundant DC bias sources may be used to increase design robustness. This drawing teaches a DC shunt arrangement using a single polarized capacitor in each hot leg of a polyphasic AC system. As shown this system is compatible with, but does not require a single point ground for operation. A similar wiring arrangement could be used in a motor generator combination. This circuit further teaches a polyphasic AC anti-series configuration and method for continuous forward DC biasing.

Figure 29:
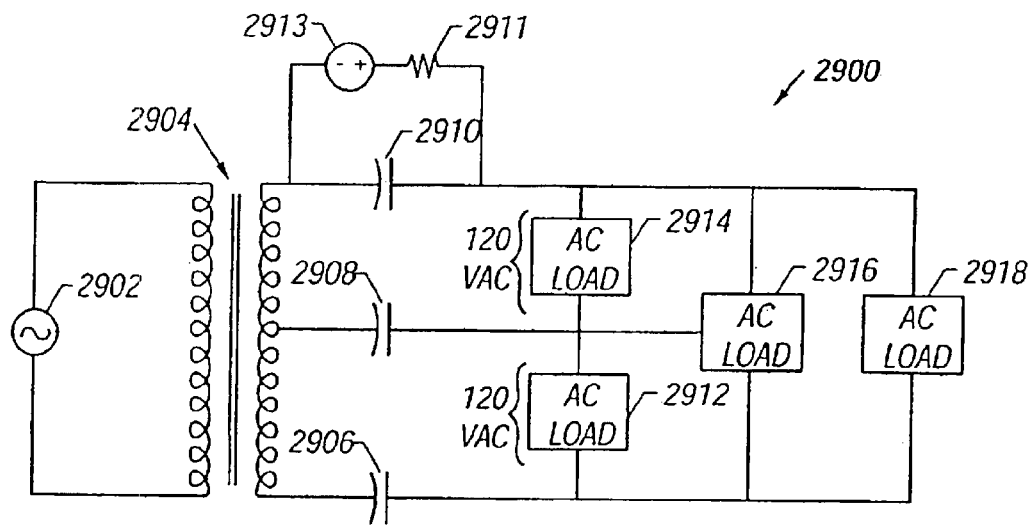
FIG. 29 shows a 120:240 Volt single-phase system of the present invention, wherein a single PECS device in each leg serves as part of an anti-series capacitor configuration.

FIG. 29 shows circuit 2900, which is a single-phase 240:120 VAC single-phase network commonly used in U.S. residences. Circuit 2900 is composed of AC source 2902, AC source transformer 2904, polarized capacitors 2906, 2908, 2910, DC source 2913, AC blocking resistor 2911 and AC loads 2912, 2914, 2916, 2918. The capacitor antiseries arrangement in circuit 2900 is composed of a single polarized capacitor in each leg. The DC bias source composed of DC voltage source 2913 and AC blocking resistor 2911 is in shunt with polarized capacitor 2910 and substantially in shunt with polarized capacitors 2906, 2908 by way of the transformer winds and AC loads. Note that AC loads 2912, 2914 are powered by 120 VAC, load 2916 by three wire 120:240 VAC and 2918 is powered by two wire 240 VAC. This circuit illustrates an alternate anti-series capacitor configuration than shown in FIG. 16. Note that the source transformer secondary or the neutral node connected to the positive pole of capacitor 2908 and loads 2912, 2914, 2916 may be grounded. Note that in this configuration, both sides can not be simultaneously grounded. The ground loop would short the DC bias voltage. Note that AC circuit elements separate the polarized capacitors in this antiseries PECS device configuration and act as steady state DC short circuits. This teaches another example of a DC junction node incorporating AC circuit elements within the DC capacitor coupling.

Figure 30:
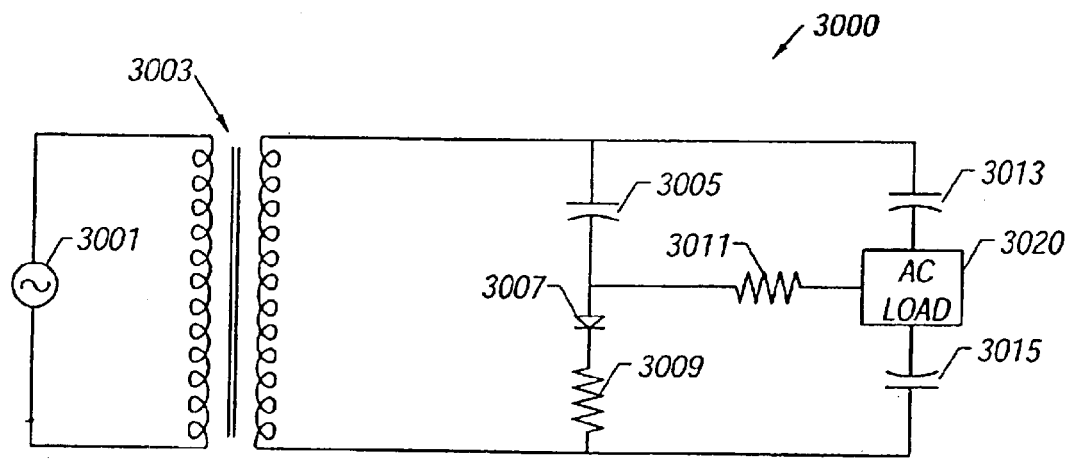
FIG. 30 shows a DC bias source using a single rectifier in an antiseries PECS device configuration of the present invention suitable for continuous operation.

FIG. 30 shows circuit 3000, a single phase AC circuit using a single diode to establish and maintain the DC bias voltage impressed across an anti-series capacitor pair. Circuit 3000 is composed of AC source 3001, source transformer 3003, antiseries capacitor pair 3013, 3015, AC load 3020, and DC bias circuitry including polarized capacitor 3005, rectifier 3007 and resistors 3009, 3011. Rectifier 3007 and resistors 3009, 3011 will charge capacitors 3005, 3013, 3015 and substantially block AC current in the steady state. Details of the connection between resistor 3011 and AC load 3020 are omitted for simplicity. The DC power supply is suitable for continuous operation but does not provide full wave rectification. The small steady state DC power requirements of the polarized capacitors render this a very useful and economic design. The primary side of AC source transformer 3003, and AC source 3001 will of course see no DC from the secondary side. The reflected harmonics due to half wave rectification will cause little AC source difficulty due to the tiny steady state bias power load relative to the AC load. FIG. 30 teaches a simple circuit implementation suitable for continuous operation.

Design Considerations

A primary design consideration is the selection of polarized electrical charge storage (PECS) device technology and configuration. The DC voltage range constraints must be considered in detail. For example industrial nickel-cadmium (Nicad) electrochemical batteries have a nominal voltage of 1.2 Volts per cell. The cells may operate with equalize charging and final discharge voltages of 1.7 and 1.0 Volts per cell respectively. The design voltage range would typically be 1.05–1.5 Volts per cell. The number of battery cells selected would then be consistent with the component and/or system AC voltage and/or resonant AC voltage as appropriate. The AC ripple current allowed by the battery cells would be used to determine the number of parallel battery cells and/or strings required for the AC application. A regulated battery-charging device would then be selected to appropriately maintain the electrochemical battery in a charged state. Each polarized electrical charge storage device, or combination of devices would require analogous DC system voltage design steps that are familiar to those knowledgeable in the trade. A more detailed description of design steps for aluminum electrolytic capacitors is provided herein.

Waveform transfer fidelity is important, and is enhanced markedly by staying within the small AC signal regime. The instant invention is configured to stay within this regime to any arbitrary degree.

The typical limiting design parameter, of the present invention, in circuit applications is the allowable AC ripple current. Both steady state load current and transient load current should be considered. The ripple current can be considered, for most purposes, to be the allowable displacement current, in the present invention. Computer grade, capacitor nominal data is based on 120 Hertz. The frequency response, ripple current, de-rating factor, for a typical computer grade capacitor, operating at 60 [Hz] is 0.8. The present invention provides abundant capacitance to spare. Thus, it is possible to reduce the AC current through a given capacitor to any arbitrary value. This is accomplished by the simple expedient of increasing the number of polar capacitor assemblies in parallel. The shunt capacitors will further decrease the AC impedance and can be used as a load voltage-regulating mechanism when adjusted in real time.

A circuit design parameter to consider is AC current carrying capacity. The transient demands of the application should be considered the key to a successful application of the present invention. Transformer inrush currents and motor starting currents are a major consideration in size selection of biased polar capacitors with the instant invention. A secondary, and related consideration, is the series impedance of the capacitor bank. Heat generation due to $I^2 R$ losses is paramount to capacitor life. Excessive heat build up is destructive to the polarized capacitors and/or other PECS devices. One typically need not consider the capacitance of the device as a sizing parameter.

Many applications are three phase, or single phase, 3 wire systems. Thus some lack of clarity may ensue as to appropriate design steps. A single capacitor per leg would be relatively clear, but for an anti series pair or configuration in each leg would have differing inter-device and intra-device voltages. For example, in the 120:208 VAC scheme, an inter-device leg to leg, (LL) fault would see 104 [VAC], due to the series combination of the two legs. On the other hand, an intra-device fault could see 208 [VAC]. A leg to neutral fault would see 120 [VAC] across the present invention. Application specifics, electrical and fire codes, will determine whether worst case design parameters should be applied. In the resonant case, the voltage requirement for the intra-device fault would be approximately 312 [$VAC_{RMS}$], which corresponds to 442 Volts peak-to-zero. This would require a minimum DC bias voltage of 221 [VDC] and a capacitor rated voltage in excess of 442 [VDC], neglecting capacitor component error and AC system voltage variation.

Note that circuit fault protection and surge protection are important design parameters for all applications. Basic considerations also include network available symmetric and asymmetric fault currents. Suitable equipment should be provided to allow clearing of downstream faults without unnecessary damage to the instant invention. Fuses, circuit breakers, switching, ground fault circuit interrupters, current limiting devices and solid-state devices are considered for this duty. Application specifics will determine an appropriate combination of protection elements. MOVs and other surge arrestors can be placed in shunt to neutral and ground to reduce voltage surges and spikes. Similarly, they can be placed in shunt with the present invention. This will similarly reduce damage to device components in high voltage conditions.

Two-port circuit parameter analysis techniques apply, and most two port interconnections are allowed. These tools apply to the instant invention; as with any other AC capacitor implementation, when the AC terminals of the instant invention, are treated as a black box. It is noted that, a set of engineering approximation disclaimers, are typically enunciated, in the use of such techniques. These include, within engineering approximations, first order approximation, simple model and the like.

Inrush, starting and fault currents exhibit extremely low, lagging power factors, on the order of fifty percent, (0.5, Lagging). In some cases the magnitude of these currents can be reduced by the presence of series capacitance. The maximum current is an important design consideration in circuit analysis and conductor selection. The duration of motor starting, rotor lock, inrush currents, full load currents and fault currents should similarly be considered in network analysis and series capacitor sizing. The instant invention is suitable for fault analysis using the sequence method and other standard fault calculations.

The instant invention is suitable for use in shunt with AC loads and/or sources. The AC circuit will exhibit resonant current phenomenon similar to that detailed with respect to voltage in series applications. Shunt capacitors are typically current limited or time limited by cycling controls in AC network applications. The high capacitance provided by the instant invention will provide an improvement to available world utilities in shunt configurations as well as in series applications. PECS device design considerations in shunt configurations include AC currents of up to 150% of the AC source provided current. The low AC impedance of the instant invention may produce a virtual short if current limiting methods are ignored. A current limiting load such as a resistor may be placed in series with the anti-series PECS device configuration in AC shunt applications. If the resistor is doing useful work, the energy is not lost.

Resonance is well defined and understood by those skilled in the trade. The two most basic manifestations of this phenomenon are series and parallel resonance. Circuit resonance is sometimes the object of a design. On other occasions, resonance is unplanned and destructive. Circuits with resonance phenomenon will display currents and/or voltages far in excess of those seen in non-resonant operation. It is typical to increase circuit current capacity and/or voltage ratings by more than fifty percent when resonant conditions are expected. Design of resonant systems should include additional heat dissipation measures due to the high voltage and/or current conditions. The loss angle (delta), and measured heat generation become important design criteria in such cases. In some applications a circuit may be tuned to resonate only during low system voltage conditions. This allows the voltage rise associated with series resonance to offset the low voltage system condition. An analogous design could be used for current maintenance with a shunt, or hybrid resonant design.

Transient network voltage surges and spikes should also be considered with the present invention. Such rises in voltage due to lightning, switching operations and similar events have great bearing upon all equipment. Inductors, MOVs, avalanche diodes and other surge arrestors may have some utility in protecting circuits of the present invention and other connected equipment from damage. The instant invention provides some transient protection to connected loads, by virtue of the capacitive opposition to instantaneous voltage change. If the transmission time constant is longer than that of the MOV to ground, the load may be spared. Also standard design constraints regarding current limitation and circuit protection should be employed. For example, take the case of a sinusoidal waveform. The peak to zero voltage magnitude is greater than the RMS value by a factor of root two. Thus for a 120 [VAC] source, the actual peak to zero voltage value is 169.71 Volts. In the three phase case of (120:208)[VAC], and the latter figure is the line to line RMS voltage, and differs from the line to neutral voltage by a factor of root 3. The equivalent line to line peak to zero voltage is thus, 293.94 [VAC].

Most useful AC electrical loads have lagging power factors. The instant invention can add a stable leading power factor device to the public utility. When connected in series with resistive and/or lagging power factor loads, an improved, unity or leading power factor can be realized as seen by the AC source. The capacitive circuitry, and/or inductive elements may be switched in and out of the network as needed. Banks of anti-series capacitors may be separately controlled and when switched in or out of the circuit, the overall circuit parameters are altered. The net result is increased efficiency, control and stability of power transfer. In addition, signal transfer fidelity and energy storage may be increased as needed. These are valuable additions to the public utilities.

Inrush currents create significant problems in electric grid voltage regulation. Series capacitors have the capability of improving the power factor of the inrush currents. Improved instantaneous power factor reduces the instantaneous current magnitude requirements, on the connected source or electric utility. Polarized capacitor AC impedance is observed to increase, with conducted current, another current limiting feature of the instant invention. Reduced instantaneous current requirements, reduces instantaneous power transmission and distribution loss. Reduced transmission and distribution losses, reduces demand on the source or connected utility. Thus we see that reduced inrush and starting requirements increase the network instantaneous reserve power capacity and stability. Other current limiting methods are disclosed herein and/or alluded to herein and claimed.

Steady state voltage regulation is a similar application of the present invention. A series bank of capacitors can be subdivided. As AC load increases, additional capacitors can be brought on line via static switch, electromechanical contactor or other mechanisms. By this method, the series resistance of the capacitor bank is reduced. Similarly, in a resonant application, the addition or subtraction of capacitance can have a profound influence on network AC voltage. Thus, AC voltage regulation can be one of the uses of the present invention. In some cases, two AC systems have different DC bias conditions. If they have a common magnitude and are phase locked, the present invention can be used to couple them together. The present invention can provide an alternate isolating AC coupling method. It is expected that many applications will ensue from this utility.

The instant device can be used in a continuous duty, single phase, split phase motor and/or capacitive AC induction motor. Thus, both windings can be used continuously, when wound for such duty. This vectoral current manipulation will define single-phase motor rotation direction. It will further serve to eliminate the 120-Hertz vibration (hum), which is present in single-phase motors. This implementation will allow the elimination of the disconnection circuitry. Alternately, the split phase motor design may be reversed, removing the lagging wind from service after startup. Clever application of precisely regulated vectoral currents may be used to economically improve synthesis of three-phase electricity from a single-phase source.

Practical realizations of the present invention may require bleed resistors or the like in parallel with the polarized capacitors. This will provide increased personnel safety during maintenance operations. Bleed resistors can be full time devices, or alternately may be switched into the circuit, when the unit power supply has been disconnected or disassembled. Many electrical specifications explicitly call for bleed resistors. While some responsiveness, efficiency and stability are lost with the addition of bleed resistors, they do not pose a significant performance problem with the instant invention. Such resistors serve the additional purpose of reducing AC and DC voltage variation impressed on the capacitors due to capacitor component tolerance and/or component error. It is noted that capacitance, impedance, leakage currents and the like vary with temperature, age and other service conditions. Such factors become of importance where multiple series and/or antiseries assemblies are employed.

Where series resonant conditions are encountered, it will be desirable to increase capacitor voltage ratings and DC bias voltage magnitudes. Transient resonance conditions in AC networks may require a controlled (regulated) DC bias power supply, in applications otherwise served by uncontrolled supplies. An optional, non-controlled floating DC biasing scheme, which nonetheless provides an appropriate potential for various operation modes is discussed, and claimed herein. The series load resistance and internal capacitor resistances will typically damp some resonance phenomena. Capacitor specifications in AC network conditions do not typically require such high voltage ratings. This may become a more prevalent design requirement with the advent of widespread use, of polarized capacitors, in AC networks.

Moreover, induction generators have significant trouble powering induction motors. There is a substantial deficit of magnetizing VARs. The present invention provides a plethora of capacitive reactance, and thus substantially improves such applications. In that induction generators are substantially less expensive than synchronous generators, great economic benefit is expected to ensue.

Both resonant and non-resonant applications may be considered (for any frequency below the self-resonance frequency of the polarized charge storage device) and can be calculated and/or measured. Similarly, other arbitrary waveform applications may be selected for calculation and/or measurement. In the following example, an application using computer grade, large aluminum can, electrolytic capacitors, in a non-resonant, sinusoidal, sixty 60 [Hz] case is considered. In this example, simple first order calculations are to be performed.

Consider a simple distribution load application where the maximum steady state current is 10 [A], and the maximum transient condition is 90 [A]. The duration of the transient condition is assumed to be thermally significant. The system voltage is 120 [VAC$_{RMS}$], plus or minus 10%. The ambient operating temperature selected is 45 [° C.]. A forwardly biased, anti-series polarized capacitor pair of the present invention will be placed in series with a single source and load. (The anti-series pair will be placed in the hot lead.) Capacitance is assumed to be +/−20% of nominal. A design factor of 10% will be applied. The simple, first order calculations shall assume moving air conditions with no heat sink or other thermal capacitor design or application thermal enhancement. Temperature and frequency corrections and capacitor manufacturing tolerances are ignored in this example. Similarly, voltage margins for reduced signal distortion and life extension are neglected. Let:

| | |
|---|---|
| $V_{rms}$ = | Root mean Square of the AC Voltage |
| $V_{pp}$ = | Magnitude of the AC Voltage wave, peak to peak |
| $V_{po}$ = | Magnitude of the AC Voltage wave, peak to zero |
| $V_{half}$ = | AC voltage across a single capacitor of a series anti-series pair |
| $V_{surge}$ = | Capacitor rated maximum DC surge voltage |
| WVDC = | Rated DC voltage of the Capacitor |
| $V_{bias}$ = | Capacitor DC bias voltage |
| $D_{fac}$ = | 10% Design Factor |
| $C_{fac}$ = | 20% Capacitance Variation |

Note that:
$V_{pp} = 2\ V_{po} = 2\ V_{half} = 2\ V_{rms}(\text{root two})$

It is observed that the instantaneous superposition of Vbias plus Vhalf must remain below the WVDC. It is also noted that the magnitude of Vbias must equal or exceed Vhalf to maintain a continuous positive DC bias voltage condition across the polarized capacitor. It is further observed that the AC voltage steady state magnitude is maximized when the DC bias voltage is ½ the magnitude of WVDC. The AC surge magnitude is maximized when the DC bias voltage is ½ the maximum DC Surge voltage range of the capacitor. We thus observe that (Vbias+Vhalf), must be equal to or greater than (GE), the magnitude of the system AC voltage. AC voltage division is affected by the variation in the actual capacitance of the capacitors. Therefore, with an allowance of 20% for capacitance variation and for the 10% system voltage magnitude variation, we have:

$(Vpp) \times Dfac \times Cfac = (169.71 \times 2) \times 1.10 \times 1.20 = 448.03$ Volts.

On a per capacitor basis, this becomes $(Vpo) \times Dfac \times Cfac = (169.71) \times 1.10 \times 1.20 = 224.02$ Volts.

The AC voltage will be divided across the two anti-series wings of the instant invention. Thus we can make a first order device selection from this information.

A recent Cornell Dubilier Catalog lists the model number DCMC123T450FG2D. This capacitor is listed with a nominal capacitance value of 12,000 microFarad, ESR of 13.3 milliOhms, and a maximum rated AC ripple current of 24.0 Amps. The WVDC and Vsurge are 450 VDC and 500 VDC respectively. For this case Vbias shall be selected to be WVDC/2 or 225 Volts DC. This will correspond to a nominal superposition voltage of:

$Vhalf + WVDC/2 = 449.02$ Volts.

Selecting eight total capacitors (4 per side) will provide a current rating of 96 Amps.

The total nominal capacitance of the device is 12,000×4/2=24,000 microFarad. The nominal ESR is 6.65 milliOhms, the capacitor impedance is on the order of 12 milliOhms, and the magnitude of the load impedance is 1.33 Ohms and 12.0 Ohms for the transient and steady state conditions respectively. The steady state AC voltage drop across the capacitor assembly is on the order of 0.12 Volts, and the drop across each capacitive wing is 1.1 Volts in the more severe transient condition. In this example, we see that except for the resonant and fault conditions, the capacitor voltage rating is much higher than necessary. The advantages to considering lower voltage capacitor ratings are size, weight, capacitance and cost. The disadvantages are device destruction in fault, or resonant conditions. As always, application economics, and safety concerns will normally decide the issue. This device could be constructed using fast fuses, surge arrestors, bleed resistors, metering and polishing capacitors for a more robust design.

Technicians should exercise a high degree of care in handling circuits constructed to the design standards herein. The most widespread electrical industrial standard of, 'Lock Out, Tag Out', is not sufficient for safety. The large electrical capacitors, which may be utilized in the present invention, may remain electrically charged for many days, unless suitable bleed resistors, or the like, are provided. The high voltage conditions present; clearly constitute a life-threatening hazard. An extreme degree of caution is therefore recommended to anyone handling the charged devices of the present invention. Those unskilled in the art should avoid contact with the circuits and circuit elements. For example, a d'Arsonval meter placed in shunt, with a polarized capacitor, may short the DC bias voltage as well as the AC source. This will disrupt the process entirely and may burn up the ammeter. It may also cause capacitor reverse biasing, with the attendant shorting and subsequent rupture. Those unskilled in the design of this circuitry should exercise extreme caution in adding circuit elements. A coil or small resistor placed in shunt with a polarized capacitor will duplicate the results of the meter mistake above. For this reason, the normal course should be to use the polarized capacitor assembly as a unit.

PECS device self-resonance phenomenon can be shunted to ground with an appropriate RFI filter, or damped if it occurs.

The frequency response of the PECS device circuits herein provides a useful addition to certain variable frequency devices. The reduction of circuit effective capacitance with increasing frequency partially offsets the impedance drop with increasing frequency. For example, the power transfer efficiency within a variable speed drive may be enhanced, while low frequency current limiting is provided. Thus, the drive may operate with improved power factor over an extended frequency range.

Full wave rectifiers may be constructed by coupling a single PECS device to each terminal of an AC power source as though in an anti-series configuration. The center node is then broken apart. A Rectification Bridge and DC output section is then connected to the free ends of the PECS devices, where the DC junction node had been. The DC output is then put to use in floating DC applications. A volt divided portion of the DC output is snubbed back to the PECS devices for biasing purposes. This design eliminates the need for an isolation transformer to power a battery charger or DC power supply. In addition the power factor of the rectifier will be corrected relative to the lagging power factor of an isolation transformer powered device. This circuit may be constructed in single phase or polyphasic applications. Other similar energy conversion designs are envisioned herein.

There exist applications exploiting the terminal characteristics of the discreet components. A volt divider is present, and properly designed filters can be used. High pass, low pass, band pass and blocking filters, tied to the center node, should be attempted with extreme caution, and personnel shielding. It is considered that circuit design considerations including magnetic saturation, resonance, Bode plots, Nyquist plots, and the like are well known, to those who are familiar, with the art.

Along these lines, there are many circuit realizations suitable for establishing and maintaining the proper DC capacitor bias condition. The DC may be derived from any suitable scheme including both regulated and unregulated sources. Care is taken to avoid ground loops and DC biasing of the AC supply; typically through the use of electrical isolation via transformer, and ungrounded secondaries (floating DC power supplies). In addition, batteries can be used in the system, to increase reliability. Battery supplies provide a redundant power supply for the period of their designed backup. A small, electrochemical battery, will provide many days of sufficient active DC bias supply, based on the slow decay of charge in polarized capacitors. The selection of a battery technology is application specific. Factors including price, ambient temperature, seismic conditions, AC power reliability, ventilation, expected lifetime, and the like, dictate battery selection. The battery maximum charging voltage and final discharge voltage, or DC system design should keep the polarized capacitor out of the AC signal clipping ranges.

The highest DC bias voltage levels are required in resonance, fault, motor starting, transformer inrush, switching operations, system voltage spikes and like conditions. Lower bias voltage may be employed in other operating conditions to prolong capacitor life. This voltage adjustment can be automatic with an appropriate feedback system. Additional circuit elements such as bleed resistors, loading resistors, harmonic filtration, voltage surge arrestors, non-polarized polishing capacitors, over current protection, ground fault protection, switching mechanisms, diagnostics and the like, can be added, as required, for electrical safety concerns and particular applications. Other implementations may include contactors, DC pre-charging, soft start mechanisms and the like. Alterations and adaptations of this nature do not constitute a significant deviation from the process presented herein.

There exist numerous methods of implementing the present invention. The two broadest areas are the bias source and the AC/DC interface. The breadth of these subjects; is considered to be incorporated herein. In manufacturing and implementations of the instant invention, it is expected that various schemes of economy will be adopted. For example, discrete diodes are shown on the drawings herein. Various diode combinations exist in the marketplace today. Two such common combinations are the bridge rectifier and the common cathode dual diode. Devices such as this reduce the discrete component count and thus, the manufacturing cost. Multi-pole capacitors are another method of reducing assembly connection steps. The Wheatstone bridge is a similar resistive combination. Indeed, the theme of microcircuitry design economics has been the progressive reduction in discrete components. Such labor saving utilities are explicitly incorporated herein. It is further asserted that various capacitor cooling strategies and shock hazard protection systems will be employed in embodiments of the instant invention. Such thermal regulation and electrical insulation methods and designs are explicitly incorporated herein.

Further, in some applications explicit interfaces are most economically included, while other applications will make use of, existing external circuit topology. All device capacity levels, as measured in amperage, voltage and/or frequency response are included in the present invention. Similarly, all suitable polarized electrical charge storage devices are embraced herein. This invention may be embodied in other specific forms without departing from the spirit or essential characteristics thereof. It is important to note that in each of the above embodiments, the components may be scaled up or down, in size. Representative circuit designs and method of fabrication thereof are outlined. The most economical realization will vary, according to application variables, including but not limited to: system voltage, steady state current requirements, transient current requirements, resonance probability, selected capacitor model characteristics, bias power supply selection, environment, redundancy requirements, external fault considerations, internal fault considerations and the like.

Additional objects, advantages and novel features of the invention are set forth herein, or will become apparent to those skilled in the art, upon examination of this disclosure, or may be learned by practice of the invention. The objects and advantages of the invention may be realized and attained, by means of the instrumentalities, and combinations particularly pointed out, implied herein and/or familiar to those in the trade. The embodiments, of the present invention, described herein; are intended, to be taken, in an illustrative and not a limiting sense. Various changes, modifications, alterations and additions may be made to these embodiments: by persons skilled in the art, without departing from the scope of the present invention as defined herein. All changes, which come within the meaning and range of equivalency, of the claims, and other disclosures herein, are therefore, intended to be embraced therein. Many continuous and/or transient, uses and/or applications of capacitors in AC networks are known to those practiced in the art, including but not limited to: resonance, commutation, snubbing, ferro-resonance, surge protection, compensation, energy storage, fault control, voltage regulation, current limitation, control signal transmission and the like. It is further intended that the claims and disclosures be interpreted to cover all such applications, alterations and modifications, as fall within the true spirit, scope and meaning of the invention.

Appendix A: Glossary of Terms

The term "anti-series" refers to two or more PECS devices coupled together at their anodes and/or their cathodes. That is, anti-series PECS devices have a DC junction node at their anodes, cathodes, or both their cathodes and anodes. This is to be considered in its broad sense, and shall not, for example, exclude manifold configurations of larger numbers of components such as with multiple PECS device anodes (or cathodes) connected substantially together at a DC junction node in current divider designs. For example, five PECS devices, in a star configuration with their anodes connected together, would each be in anti-series configuration with one another. It is noted that PECS devices in the various legs of a polyphasic AC system may also be in an anti-series configuration with one another. Similarly, in identifying a PECS device in an anti-series configuration, any given device may actually include multiple shunt-configured devices for, e.g., increasing ampacity. Additionally, several series PECS devices may be joined together in an anti-series fashion in order to increase the effective AC voltage rating. Likewise, several anti-series PECS device pairs may themselves be joined in a series fashion to increase the effective voltage rating. Finally, it is noted that AC system components (such as AC sources or loads) may actually be connected between anti-series devices at a DC junction node.

The term "AC" and "AC source" are used in their broad sense. The term AC and AC source shall include but are not limited to fixed frequency, variable frequency, fixed amplitude, variable amplitude, frequency modulated, amplitude modulated, and/or pulse width modulated AC. Other signal and/or communication techniques including sideband and superposition as well as other linear, nonlinear, analog or digital signals and the like are expressly included. AC sources may include harmonic components. AC and AC source are considered to refer to time varying signals. These signals may contain data and/or power. Hybrid AC sources varying in multiple methods and/or modes are similarly included. References to a single AC source shall not be construed to eliminate plural AC sources.

The term "AC blocking device" shall include any device, method, design or technique that provides a relatively large AC impedance, as compared with associated anti-series PECS devices, and at the same time may be configured to provide a DC current path for biasing such PECS devices. For example, an AC blocking device could include but is not limited to resistors, inductors, rectifiers, electrical switches and the like.

The terms "continuous and steady state", as used herein are not intended to indicate any unsuitability for transient applications such as starting and the like.

The terms "DC", "DC electricity" and "DC current" may be any technology, design, condition, physical condition or device, creating, causing, contributing, supporting, or favoring a unidirectional or predominantly unidirectional flux, displacement, transmission and/or flow of one or more electrical charge carriers including but not limited to electrons, ions and holes. This shall not be construed to exclude the bidirectional travel of oppositely charged particles. DC shall refer broadly to a steady state voltage that does not substantially vary with time.

The term "DC source", "DC voltage source" or "DC power source" is used in its broad sense. This term generally covers and includes any method and device used or useful in the generation, production or AC rectification to produce DC electricity. DC power supplies expressly include, but are not limited to DC generators, electrochemical batteries, photo-voltaic devices, rectifiers, fuel cells, DC quantum devices, certain tube devices and the like. They shall include regulated, unregulated, filtered and non-filtered types. DC sources shall expressly include but are not limited to rectifiers powered by non-electrically isolated sources, autotransformers, isolation transformers, and ferroresonant transformers. DC-to-DC supplies, switching DC power supplies, pulse chargers and the like are similarly included. The singular term shall not be construed to exclude multiple and/or redundant DC sources in shunt, series and/or anti-series configurations. Single phase and polyphasic DC sources and/or chargers are included. The ability to adjust the DC bias level in real time is similarly included. The use of 'diode dropper devices' and precisely regulated floating DC power supply voltages can provide operational and design benefits, especially where electrochemical batteries are included for power source redundancy, or are the anti-series PECs device employed.

The term "DC bias source" is used in the broad sense. This term generally covers and includes any method, design and/or device used or useful in the production and distribution of DC voltage and current to PECS devices while limiting, restricting and/or blocking the flow of AC current. The term DC bias source may include, but is not limited to, at least one DC voltage source substantially in series with at least one AC blocking device. In the instant invention, one or more DC bias sources are connected across PECS devices for the purpose of establishing and maintaining a forward DC bias voltage across said PECS devices. The DC bias source will prevent the AC source from reverse biasing or excessively forward biasing the connected PECS device. A single DC voltage source can be configured to serve as a DC bias source for numerous PECS devices by means of appropriately connected DC conducting, AC blocking devices. Similarly, multiple DC voltage sources and/or DC bias sources may be configured to provide redundant bias voltage sources to anti-series PECS devices in an AC application.

The term "DC junction node" corresponds to a node in a configuration of two or more anti-series PECS devices where like-polarity device nodes are coupled together. It should be noted that a DC junction node may (or may not) incorporate one or more AC devices (such as an inductor) with negligible DC voltage across the AC device. That is, there is substantially no DC voltage difference within a DC junction node. Similarly DC bias circuitry, meters, indicators, alarms and the like may be connected to DC junction nodes.

The term "electrical isolation" is used in its broad sense. This term generally includes but is not limited to isolation transformers, ferro-resonant transformers and separately produced, inverted and/or generated electrical power supplies in the case of AC. DC isolation may be accomplished by the use of capacitors. The term electrical isolation shall include DC power supplies that are produced, rectified or generated separately. Electrical isolation is intended to convey the ability to have no fixed ground reference, select a common neutral, ground, reference voltage or to alternately select distinct neutrals, grounds or reference voltage. The selection occurs at the time of connection or operable connection, and is not necessarily intrinsic to the design, construction, materials or character of the power supplies.

The term "polarized electric charge storage" ("PECS") device is used in the broad sense. This term generally covers any suitable polar electrical charge storage device, and/or apparatus which includes but is not limited to electrolytic capacitors, electrochemical batteries, certain electrical tube devices, semiconductor capacitive devices, photo-voltaic devices, fuel cells, quantum charge storage devices and the like. For the purposes of this document, a polarized electric charge storage device may be any technology or device supporting a static separation of charge, favored charge storage polarity and a capability to conduct, displace and/or transmit electrical current. In many parts of this document, polarized capacitors are used—both in description and through illustration—for demonstrating various aspects of the present invention. However, it should be recognized that any suitable PECS device may be used both in place of or in cooperation with the represented polarized capacitors. That is, none of the other PECS technologies, referred to, or described, are intended to be excluded.

The term "rectifier" is used in its broad sense herein. Any active or passive device and/or apparatus favoring or configured to favor a unidirectional flow of electrical charge carriers shall be considered a rectifier. The bi-directional flow of oppositely charged particles is expressly included within the definition of a rectifier. Rectifier includes but is not limited to one or more diodes, transistors, silicon controlled rectifiers, cut off SCRs, thyristors, IGBTs, FETs, split rings, certain tube devices and the like. Rectifying circuit configurations include but are not limited to half-wave, full-wave, split-wave and polyphasic rectifiers. Rectification pulses can be phase shifted to oppose, match or offset either AC current or voltage waveforms in the single or polyphasic cases. This can be accomplished by isolation transformer dot convention, phase shift winding methods, I/O lag, or electronically to name a few common methods.

The term 'sufficiently forwardly DC biasing' refers to the methods, devices and/or apparatus outlined or implied herein to maintain a DC bias voltage across a PECS device to substantially prevent the device from being detrimentally reverse biased by an AC signal. The DC bias voltage can be fixed to any arbitrary degree in the steady state. This contrasts with the oscillatory bias schemes of the prior art, which characteristically vary between a forward and reverse DC bias voltage on a sub-cycle basis and/or cause AC signal distortion because of excessive signal size relative to DC bias voltage magnitude. DC biasing considerations include operation within the applicable PECS device forward voltage limitations. Similarly included are bias conditions wherein the DC bias voltage magnitude of each PECS device substantially exceeds the magnitude of the impressed AC signal.

The terms 'switch' and/or 'electrical switch' refer to the methods, devices and/or apparatus by which an electrical current may be turned on or turned off. Switch shall include mechanical conductor contact designs, electromechanical devices, semiconductor devices, relays, liquid contact devices such as mercury switches, molecular switches, ionization devices, valves, quenchers, gates, quantum devices and the like. In addition, differential devices such as rheostats, potentiometers that may serve as dimmers and/or flow regulators, as well as on/off devices, and the like are included. Any state of matter and/or change in state of matter, used to effect the control of electrical flow, flux, current or conduction, displacement and the like is considered to be included in the term switch. Similarly, the sensors, actuators, controls, relays, circuit boards, chips and the like associated with various technology switches are included. Electrical switch and switch when used within this paper shall be construed in the broad sense. The devices and methods outlined herein are illustrative and not limiting.

The term "DC blocking device" shall include any device, method, design, apparatus and/or technique that provides a relatively large DC resistance and/or opposition to the flow of DC current. For example, an DC blocking device could include but is not limited to polarized capacitors, non-polarized capacitors, electrochemical batteries, other PECS devices, resistors, rectifiers and the like. Similarly, an isolation transformer serves as a DC blocking device, in that DC is not magnetically coupled. It is noted that rectifier bridges provide a higher order of DC blocking than is provided by a single rectifier or a half wave bridge.

The term "temperature regulation" shall mean the control of PECS device temperature by natural or artificially powered means to alter the surface and/or core temperature of the device. Typical methods of temperature regulation include water baths, oil baths, refrigerants, circulating systems with heat sinks, and the use of heating elements and heat exchangers. Heat pumps, solid state cooling and other such methods are suitable for the maintenance and/or alteration of device temperature.

The term "transient" as used herein is not intended to indicate unsuitability for steady state or continuous applications.

What is claimed is:

1. A polarized electric charge storage ("PECS") apparatus for operation in an AC network having an AC source and at least one load coupled to the AC source for receiving the AC signal, the PECS apparatus comprising:

at least first and second PECS devices in an anti-series configuration with one another, the anti-series PECS devices adapted to be operably connected to the AC network and subjected to the AC signal, and at least one means for producing DC electricity, said means coupled to the first and second PECS devices for sufficiently forwardly DC biasing the devices to substantially prevent them from being detrimentally reverse biased by the AC signal.

2. The apparatus of claim 1, wherein the at least one means for producing DC electricity is operably operably coupled to the first and second devices so that the AC signal is not substantially conducted through the at least one means for producing DC electricity.

3. The apparatus of claim 1, wherein the anti-series PECS device configuration is adapted to be connected substantially in shunt with the AC load.

4. The apparatus of claim 1, wherein the anti-series PECS device configuration is adapted to be connected substantially in series between the AC source and the AC load.

5. The apparatus of claim 1, wherein at least one output terminal of the at least one means for producing DC electricity is adapted to be electrically isolated from the at least one AC source.

6. The apparatus of claim 1, wherein the at least one means for producing DC electricity is ungrounded.

7. The apparatus of claim 1, wherein at least one output terminal of the at least one means for producing DC electricity is adapted to be operably connected to an AC system ground.

8. The apparatus of claim 1, wherein the first and second PECS devices are symmetrically DC biased with respect to one another.

9. The apparatus of claim 1, wherein the first and second PECS devices are connected to each other at a DC junction node, wherein the apparatus further includes at least one AC blocking device connected between the DC junction node and a DC reference node.

10. The apparatus of claim 9, wherein the at least one AC blocking device comprises a resistor that has a sufficiently high impedance compared to the first and second PECS devices for blocking the AC signal so that it substantially passes through the PECS devices.

11. The apparatus of claim 9, wherein the DC junction node incorporates at least one AC device between the first and second PECS devices.

12. The apparatus of claim 9, further comprising an AC blocking device between the DC junction node and another node from the first and second PECS devices.

13. The apparatus of claim 9, wherein the at least one means for producing DC electricity includes first and second DC sources for separately biasing the first and second PECS devices.

14. The apparatus of claim 13, wherein the first DC source is substantially in shunt across the first PECS device.

15. The apparatus of claim 14 further comprising an AC blocking device operably connected between the first DC source and the first PECS device.

16. The apparatus of claim 15, wherein the second DC source is substantially in parallel across the second PECS device.

17. The apparatus of claim 16, wherein the second DC source is connected substantially in parallel across at least the second PECS device through at least one AC blocking device.

18. The apparatus of claim 17, wherein at least one terminal of the first DC source and at least one output terminal of the second DC source are ungrounded.

19. The apparatus of claim 17, wherein at least one terminal of the first DC source and at least one output terminal of the second DC source are electrically isolated with respect to the AC source.

20. The apparatus of claim 9, wherein the at least one means for producing DC electricity includes a first DC source having first and second output terminals for providing a DC potential, the first output terminal being coupled to the DC junction node, and the second output terminal being coupled to another node from the first and second devices.

* * * * *